(12) United States Patent
Lou et al.

(10) Patent No.: US 12,273,157 B2
(45) Date of Patent: Apr. 8, 2025

(54) SYSTEMS AND METHODS FOR MULTI-AP TRANSMISSION WITH UNIFORM COVERAGE

(71) Applicant: INTERDIGITAL PATENT HOLDINGS, INC., Wilmington, DE (US)

(72) Inventors: Hanqing Lou, Syosset, NY (US); Xiaofei Wang, Cedar Grove, NJ (US); Li-Hsiang Sun, San Diego, CA (US); Oghenekome Oteri, San Siego, CA (US); Rui Yang, Greenlawn, NY (US); Joseph S. Levy, Merrick, NY (US); Frank La Sita, Setauket, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 412 days.

(21) Appl. No.: 17/437,265

(22) PCT Filed: Mar. 6, 2020

(86) PCT No.: PCT/US2020/021455
§ 371 (c)(1),
(2) Date: Sep. 8, 2021

(87) PCT Pub. No.: WO2020/185586
PCT Pub. Date: Sep. 17, 2020

(65) Prior Publication Data
US 2022/0173773 A1    Jun. 2, 2022

Related U.S. Application Data

(60) Provisional application No. 62/815,753, filed on Mar. 8, 2019.

(51) Int. Cl.
*H04B 7/024* (2017.01)
*H04B 7/06* (2006.01)
*H04B 17/336* (2015.01)

(52) U.S. Cl.
CPC .......... *H04B 7/024* (2013.01); *H04B 7/0619* (2013.01); *H04B 17/336* (2015.01)

(58) Field of Classification Search
CPC .................................................... H04B 7/024
See application file for complete search history.

(56) References Cited

U.S. PATENT DOCUMENTS 9,756,612 B2    9/2017    Park et al.
10,085,168 B2   9/2018    Grandhi
(Continued)

FOREIGN PATENT DOCUMENTS

CN    106656429 B    6/2020
JP    2016001801 A   1/2016
(Continued)

OTHER PUBLICATIONS

Aio et al., "Consideration on Multi-AP Sounding," IEEE 802.11-19/1134r1 (Aug. 9, 2019).
(Continued)

Primary Examiner — Jason E Mattis
(74) Attorney, Agent, or Firm — VOLPE KOENIG

(57) ABSTRACT

A method for multiple access point (AP) transmission is disclosed. The method comprises receiving a repetition beacon from each of a plurality of APs, each received repetition beacon comprising a common information part and an AP-specific information part; decoding at least a subset of the received common information parts to obtain a first parameter; decoding the received AP-specific information parts to obtain a second parameter for each of the plurality of APs; performing a calculation based on the first
(Continued)

parameter, the obtained second parameters and a number of the plurality of APs to obtain a calculation result; and transmitting a feedback based on the calculation result to the plurality of AP.

20 Claims, 19 Drawing Sheets

(56) References Cited

U.S. PATENT DOCUMENTS

| | | | |
|---|---|---|---|
| 10,123,266 | B2 | 11/2018 | Wang et al. |
| 10,218,463 | B2 | 2/2019 | Lou et al. |
| 10,237,818 | B2 | 3/2019 | Grandhi et al. |
| 10,880,894 | B2 | 12/2020 | Xia et al. |
| 10,924,955 | B2 | 2/2021 | Lim et al. |
| 2009/0028074 | A1 | 1/2009 | Knox |
| 2009/0075664 | A1* | 3/2009 | Palanki ............... H04L 5/0044 455/446 |
| 2015/0281993 | A1 | 10/2015 | Chen et al. |
| 2015/0288427 | A1* | 10/2015 | Wang ................ H04W 72/23 370/329 |
| 2015/0295629 | A1* | 10/2015 | Xia .................... H04B 7/0695 370/329 |
| 2018/0205442 | A1 | 7/2018 | Oteri et al. |
| 2018/0262936 | A1 | 9/2018 | Zhou et al. |
| 2018/0263043 | A1* | 9/2018 | Zhou ................... H04B 7/024 |
| 2020/0084712 | A1* | 3/2020 | Wu .................... H04W 48/20 |

FOREIGN PATENT DOCUMENTS

| | | |
|---|---|---|
| WO | 2014/066785 | 5/2014 |
| WO | 2018127203 A1 | 7/2018 |
| WO | 2018151888 A1 | 8/2018 |

OTHER PUBLICATIONS

Banerjea et al., "A Simplified Simultaneous Transmit and Receive MAC Proposal," IEEE 802.11-14/0340-00hew (Mar. 17, 2014).
Bharadia et al., "Full Duplex Radios," SIGCOMM (Aug. 12-16, 2013).
Bian et al., "Co-time Co-frequency Full Duplex for 802.11 WLAN," IEEE 802.11-13/0765r2 (Jul. 17, 2013).
Bourdoux et al., "Full-duplex Technology for HEW," IEEE 11-13/0764r1 (Jul. 14, 2013).
Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 1: Enhancements for High Efficiency Wlan, IEEE P802.11ax/D4.0 (Feb. 2019).
Duarte et al., "Design and Characterization of a Full-duplex Multi-antenna System for WiFi networks," arXiv:1210.1639 (Oct. 2012).
Gilb et al., "802.11 Full Duplex," IEEE 802.11-19/0191r0 (Jan. 15, 2018).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11.2012 (Mar. 29, 2012).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11.2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHZ, IEEE Std 802.11ac-2013 (Dec. 11, 2013).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).
Jain et al., "Practical, Real-time, Full Duplex Wireless," MobiCom (Sep. 19-23, 2011).
Kim et al., "Janus: A Novel MAC Protocol for Full Duplex Radio," CSTR Feb. 2013 (Jul. 23, 2013).
Levis, "STR Radios and STR Media Access," IEEE 802.11-13/1421r1 (Nov. 12, 2013).
Oteri et al., "Coordinated Multi-AP Transmission for EHT," IEEE 802.11-19/0071r0 (Jan. 13, 2019).
Park et al., "Multi-AP Transmission Procedure," IEEE 802.11-19/0804r0 (May 13, 2019).
Ryu et al., "Consideration on multi-AP coordination for EHT," IEEE 802.11-18/1982r1 (Jan. 9, 2019).
Singh et al., "Efficient and Fair MAC for Wireless Networks with Self-Interference Cancellation," International Symposium of Modeling and Optimization of Mobile, Ad Hoc, and Wireless Networks, pp. 94-101 (May 2011).
Srinivasan et al., "Beyond Full Duplex Wireless," Asilomar Conference on Signals, Systems and Computers (Nov. 2012).
Sun et al., "Multi-AP Group Establishment," IEEE 802.11-19/1961r2 (Jan. 2, 2020).
Taori et al., "Considerations for In-Band Simultaneous Transmit and Receive (STR) feature in HEW," IEEE 11-13/1122r1 (Sep. 16, 2013).
Wang et al., "Discussion on Multi-link Operations," IEEE 802.11-19/1213r0 (Jul. 9, 2019).
Cariou et al., "Extremely High Throughput (EHT) 802.11—Features classification and early discussion on PAR," IEEE 802.11-18/1215r0 (Sep. 2018).

* cited by examiner

Non-allowable Transmission Window

SYSTEMS AND METHODS FOR MULTI-AP TRANSMISSION WITH UNIFORM COVERAGE

CROSS-REFERENCE TO RELATED APPLICATIONS

This application is the U.S. National Stage, under 35 U.S.C. § 371, of International Application No. PCT/US2020/021455 filed Mar. 6, 2020, which claims the benefit of U.S. Provisional Application No. 62/815,753 filed Mar. 8, 2019, the contents of which are incorporated herein by reference.

SUMMARY

A method for multiple access point (AP) transmission is disclosed. The method comprises: receiving a repetition beacon from each of a plurality of APs, each received repetition beacon comprising a common information part and an AP-specific information part; decoding at least a subset of the received common information parts to obtain a first parameter; decoding the received AP-specific information parts to obtain a second parameter for each of the plurality of APs; performing a calculation based on the first parameter, the obtained second parameters and a number of the plurality of APs to obtain a calculation result; and transmitting a feedback based on the calculation result to the plurality of APs.

A wireless transmit/receive unit (WTRU) for multiple access point (AP) transmission is disclosed. The WTRU comprises: a transceiver, configured to receive a repetition beacon from each of a plurality of APs, each received repetition beacon comprising a common information part and an AP-specific information part; and a processor, configured to decode at least a subset of the received common information parts to obtain a first parameter; decode the received AP-specific information parts to obtain a second parameter for each of the plurality of APs; and perform a calculation based on the first parameter, the obtained second parameters and a number of the plurality of APs to obtain a calculation result, wherein the transceiver is further configured to transmit a feedback based on the calculation result to the plurality of APs.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
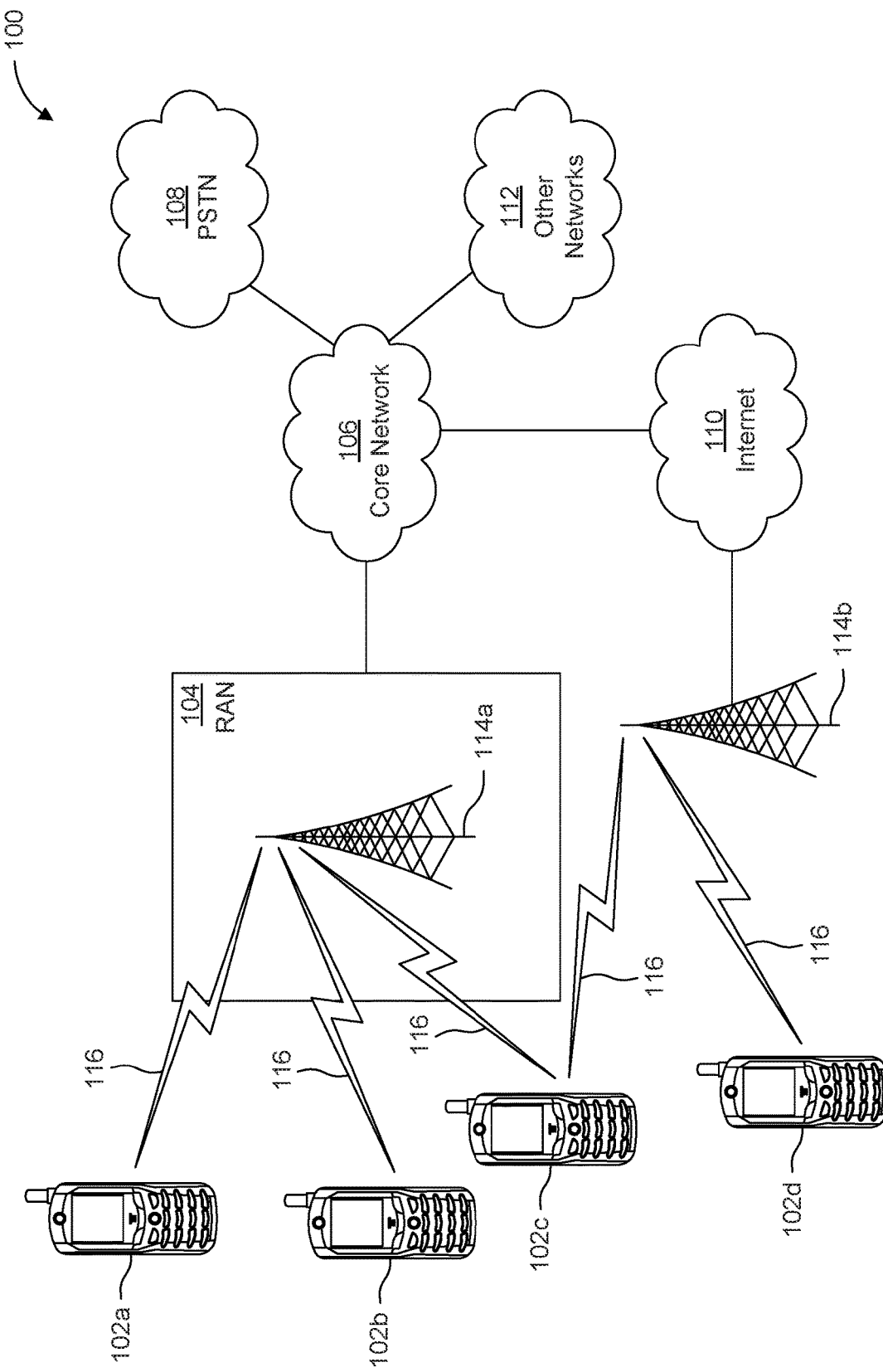
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi)), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114*b* may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
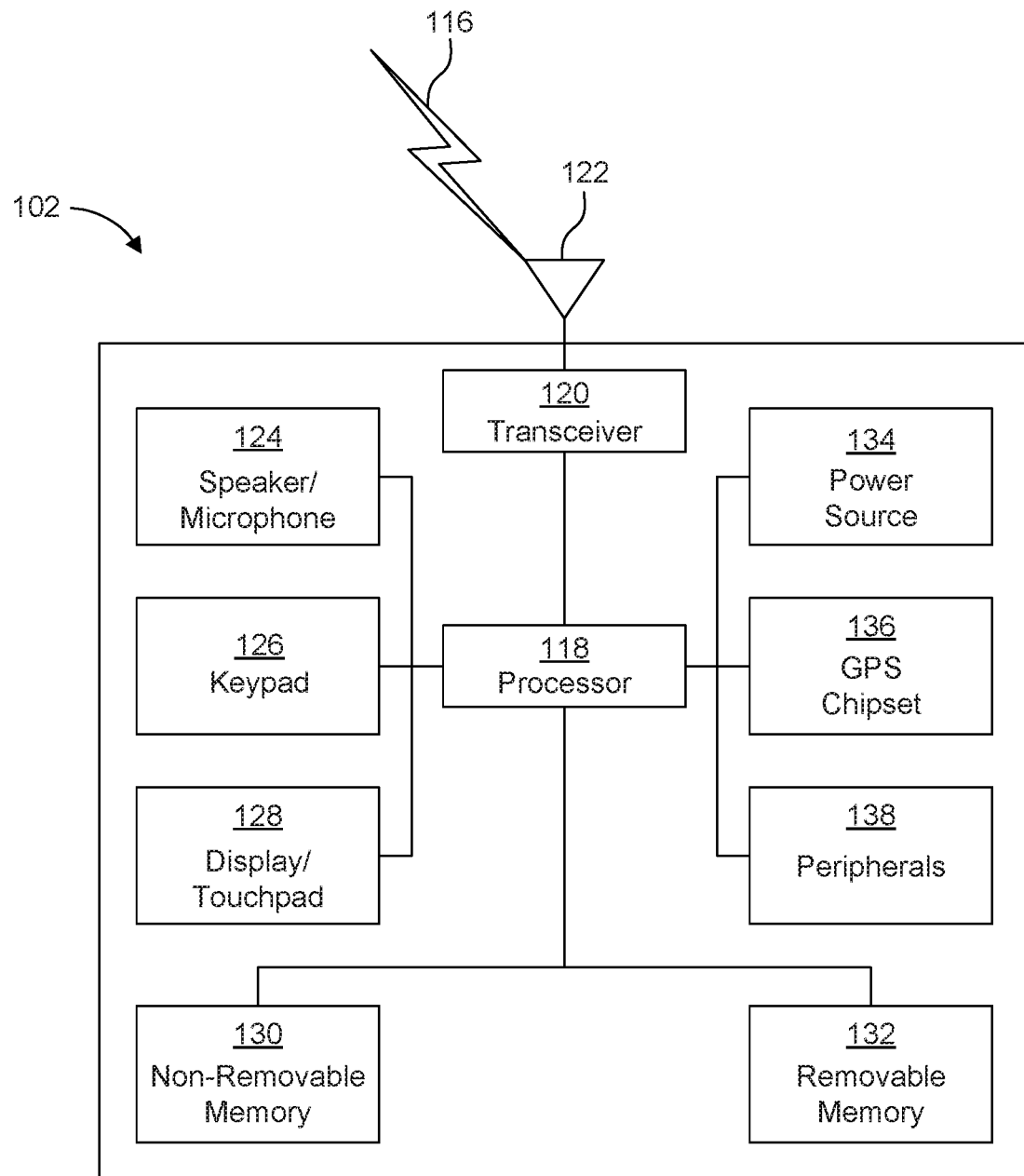
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
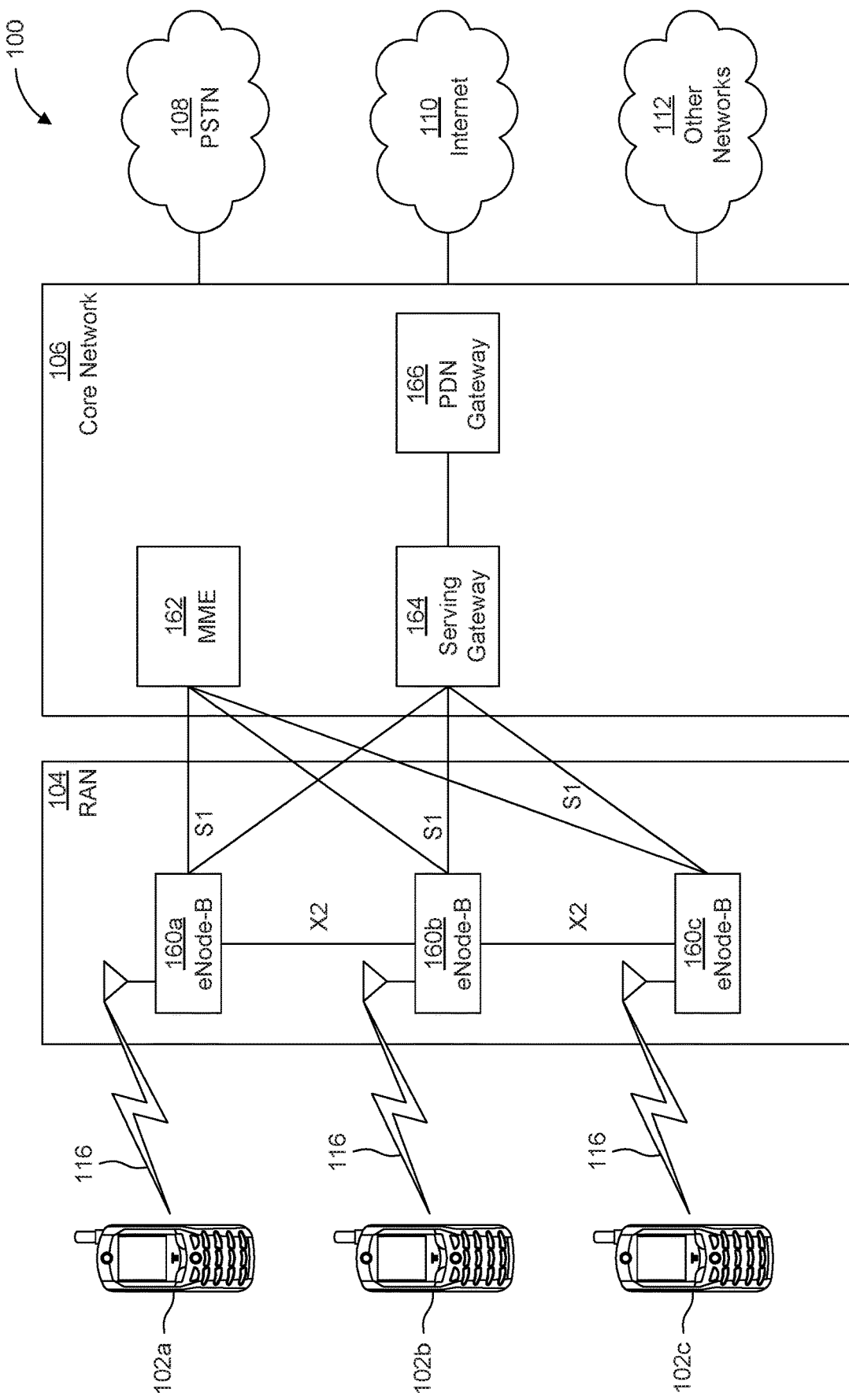
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
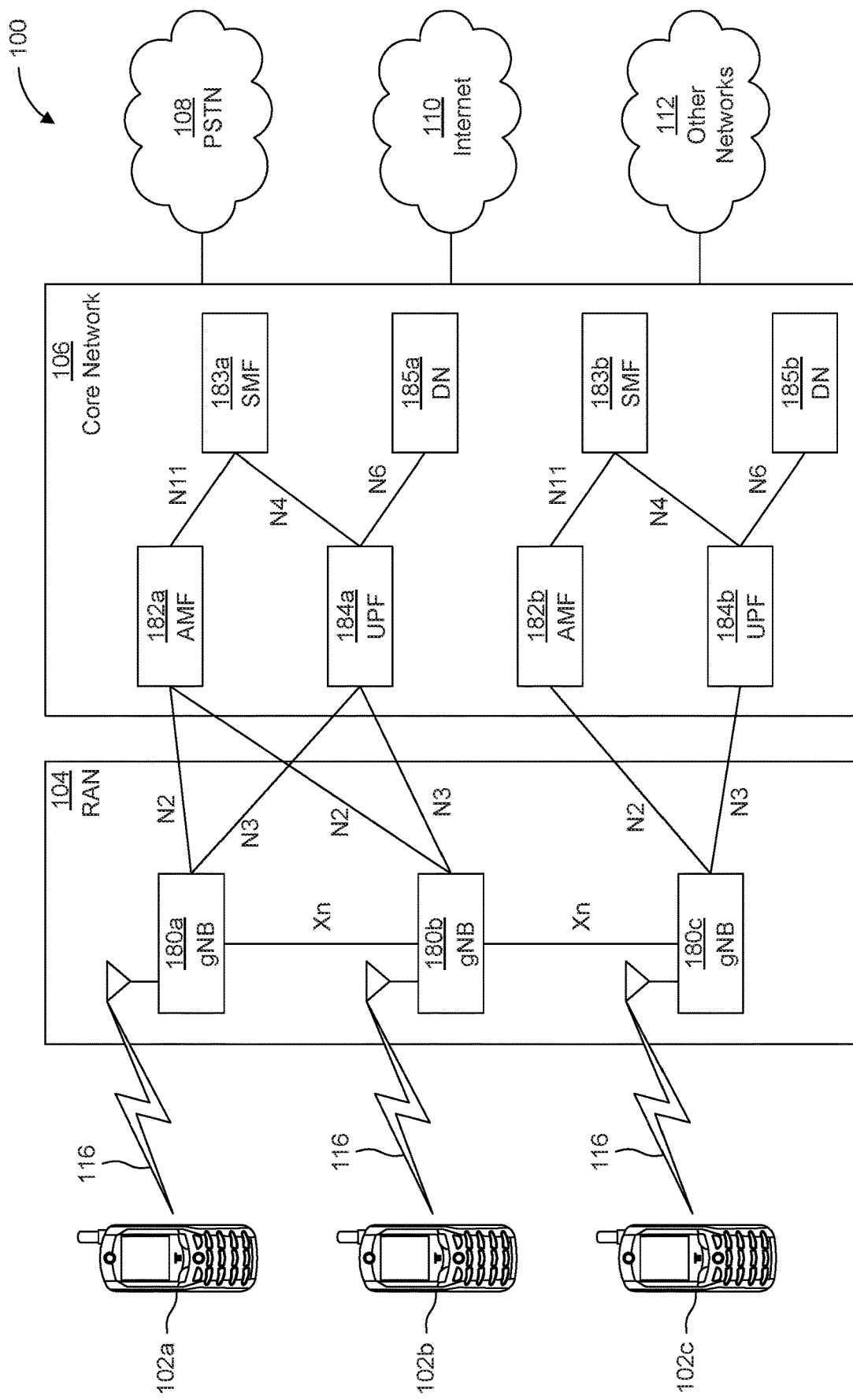
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a, 184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

In a typical 802.11 network, STAs are associated with a single AP and transmit to and from that AP with little or no coordination with transmissions in neighboring BSSs. A STA may defer to an overlapping BSS (OBSS) transmission based on a CSMA protocol that is entirely independent between BSSs. 802.11ax systems may support some level of coordination between OBSSs by spatial re-use procedures to allow OBSS transmissions based on an adjusted energy detection threshold (using the OBSS packet detection (PD) procedure) or by knowledge of the amount of interference that could be tolerated by a receiving OBSS STA (using the spatial reuse parameter (SRP) procedure). In this application, unless otherwise indicated, the terms STA and WTRU may be used interchangeably.

Some embodiments facilitate more coordination between OBSSs, e.g., by allowing transmission from multiple APs to a single or multiple STAs. Among other things, this may be distinguished from Coordinated Multi-point (CoMP) transmissions in 3GPP LTE Release 10. For example, the coordination between OBSSs may be implemented using an unlicensed band and may be specific to the 802.11 protocol.

In CoMP, multiple eNBs may transmit to the same or multiple WTRUs in the same time and frequency resource using joint processing/transmission, with the objective of improving the overall throughput for the considered WTRU. Dynamic cell selection may be treated as a special case of joint processing in which only one of the set of eNBs is actively transmitting data at any time. On the other hand, multiple eNBs may transmit to different WTRUs (each eNB serving its own WTRU) in the same time and frequency resource using coordinated beamforming/scheduling, with the objective of reducing interference experienced by each WTRU. Significant improvements of cell average and/or cell edge throughput may be achieved due to CoMP in LTE. Multiple transmit antennas may be assumed to be available for each base station. Simultaneous interference suppression (for other WTRUs) and signal quality optimization (for the desired WTRU) may be performed through spatial domain signal processing at each base station.

In general, some degree of channel state information may be assumed to be available at the base stations, e.g., through explicit feedback. Further, a certain degree of timing and/or frequency synchronization may be assumed such that more complicated signal processing to deal with inter-carrier interference (or inter-symbol interference) may be avoided. Further, the level of coordination between the eNBs may affect which specific CoMP scheme that may be possible.

Multi-AP transmission schemes in WLANs may be classified, e.g., as Coordinated OFDMA, Coordinated Nulling/ Coordinated Beamforming (CN/CB), and/or Coordinated SU/MU Transmission. In the case of Coordinated SU Transmission, multiple APs transmit to a STA in one resource unit (RU). Coordinated SU transmission may include one or more of (in order of increased complexity) Dynamic Point Selection, Coordinated SU Beamforming, and/or Coordinated MU Beamforming. In the case of Dynamic Point Selection, the transmission may be dynamically selected from one of the set of APs. Note that this may include HARQ. In the case of Coordinated SU Beamforming, the transmission is from the multiple APs simultaneously and the transmission may be beamformed. In the case of Coordinated MU Beamforming, multiple APs transmit or receive data to/from multiple STAs on one RU.

Figure 2:
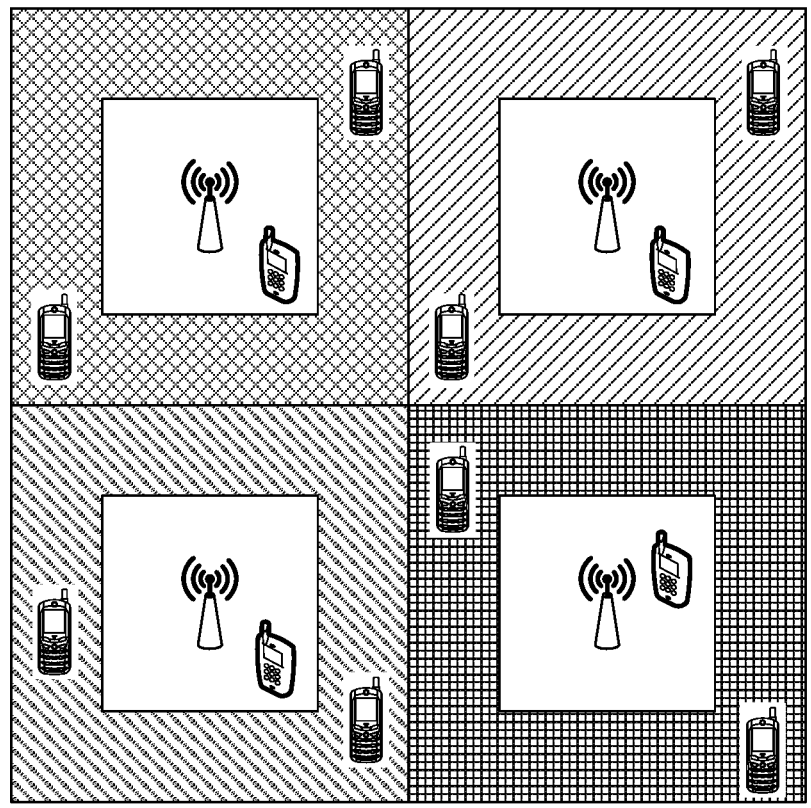
FIG. 2 illustrates an example of coordinated OFDMA fractional frequency reuse (FFR)
Figure 3:
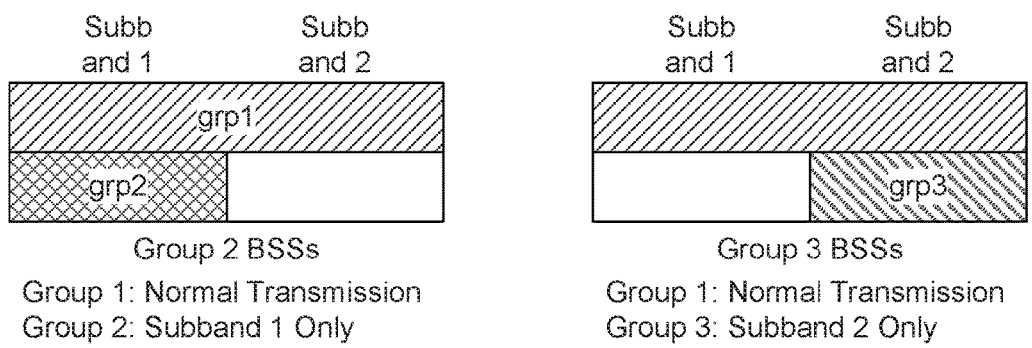
FIG. 3 illustrates an example resource allocation associated with coordinated OFDMA FFR.

In coordinated OFDMA, each group of RUs may be used by one AP only to transmit or receive data. The information may be beamformed or have MU-MIMO on each RU. Complexity may be characterized as relatively low to medium. In a simple coordinated OFDMA scheme, APs may divide the OFDMA RUs between themselves in a coordinated manner, for example, with each AP restricted to specific RUs. A more sophisticated scheme may occur in which the APs allow STAs that are not affected by interference, or will not affect others, to utilize the entire bandwidth while restricting access for the STAs that may be affected. This may be referred to as fractional frequency reuse (FFR). FIG. 2 illustrates an example of coordinated OFDMA FFR. FIG. 3 illustrates an example resource allocation associated with coordinated OFDMA FFR.

Figure 4:
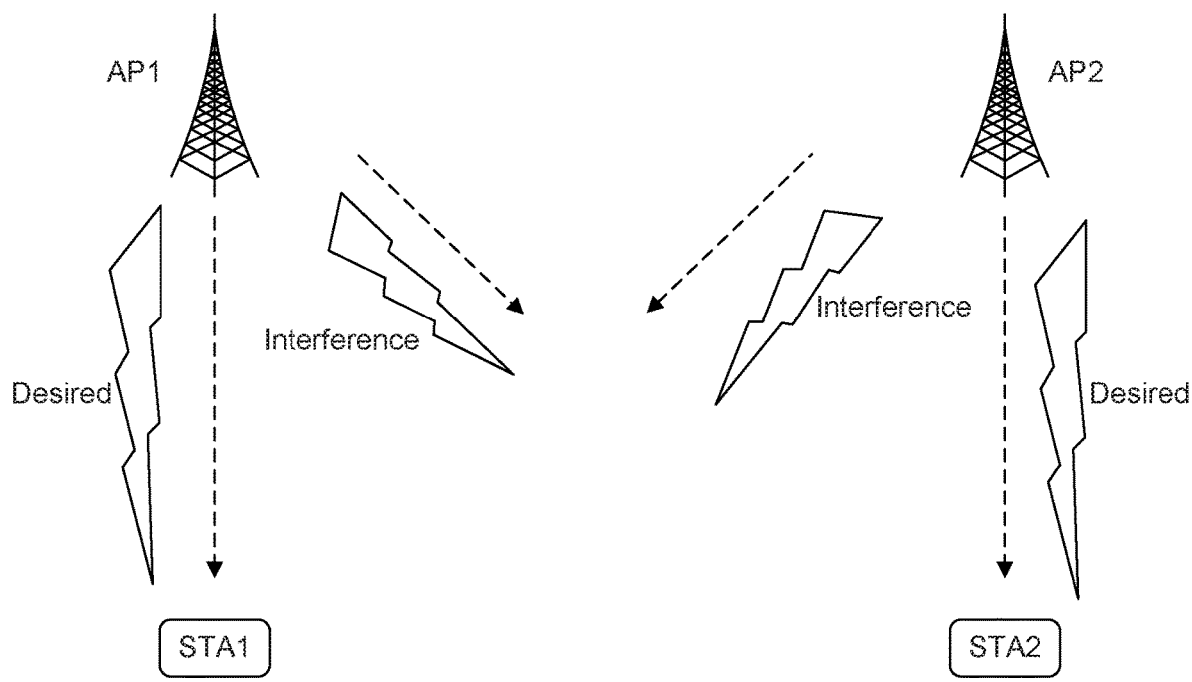
FIG. 4 illustrates an example Coordinated Nulling/Coordinated Beamforming (CN/CB) scenario.

In Coordinated Nulling/Coordinated Beamforming (CN/ CB), each AP may apply precoding to transmit information to or receive from its desired STA or STAs and to suppress interference to or from other STA(s). FIG. 4 illustrates an example CN/CB scenario. As shown in FIG. 4, AP1 may transmit information to or receive from its desired STA, i.e., STA1, and AP2 may transmit information to or receive from its desired STA, i.e., STA2. AP1 may suppress interference to or from STA2, and AP2 may suppress interference to or from STA2. It is noted that in this case, the data for each STA may only be needed at its associated AP although in some implementations channel information from the other STA may be needed at both APs.

In coordinated SU or MU (SU/MU) transmission, multiple APs may coordinate to transmit information to or receive information from a single STA or multiple STAs simultaneously. In this case, both the channel information and the data for the STA(s) may be needed at both APs. Coordinated SU/MU transmission may include Coordinated SU Transmission and/or Coordinated MU Beamforming.

Figure 5:
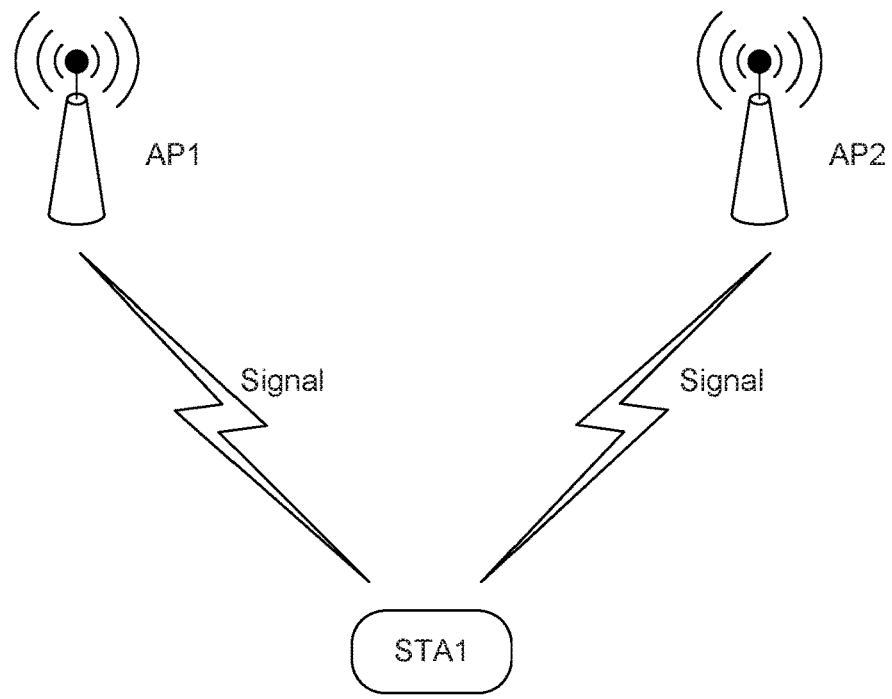
FIG. 5 illustrates an example SU Joint Precoded Multi-AP transmission or Coordinated SU Beamforming scenario.

In Coordinated SU Transmission, multiple APs may transmit to a STA in one RU. Coordinated SU transmission may include, (in order of increased complexity): Dynamic Point Selection, and/or Coordinated SU Beamforming or Joint Precoding. In Dynamic Point Selection, the transmission may be dynamically selected from one of the set of APs. This selection may incorporate HARQ. In Coordinated SU Beamforming or Joint Precoding, the transmission may be from the multiple APs simultaneously and the transmission may be beamformed or precoded to the desired STA on one or more RUs. FIG. 5 illustrates an example SU Joint Precoded Multi-AP transmission or Coordinated SU Beamforming scenario. As shown in FIG. 5, there are two APs (AP1 and AP2) and only one STA (STA1). AP1 and AP2 may do transmission to STA1 simultaneously and the transmission may be beamformed or precoded to the STA1 on one or more RUs.

Figure 6:
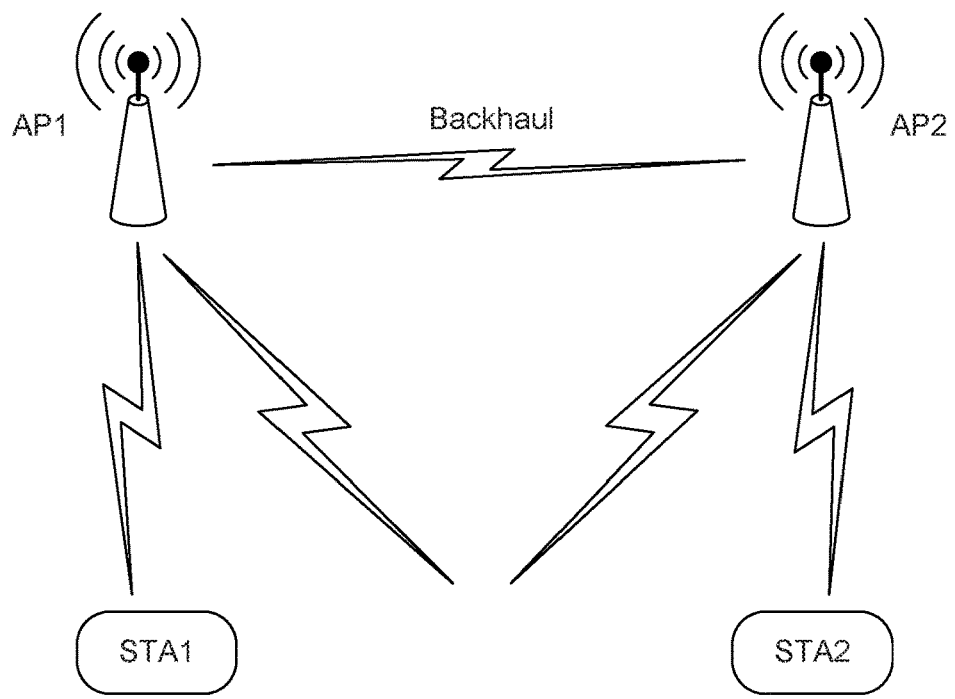
FIG. 6 illustrates an example MU Joint Precoded Multi-AP transmission or Coordinated MU Beamforming scenario.

In Coordinated MU Beamforming, multiple APs may transmit or receive data to/from multiple STAs on one or more RUs. FIG. 6 illustrates an example MU Joint Precoded Multi-AP transmission or Coordinated MU Beamforming scenario. As shown in FIG. 6, there are two APs (AP1 and AP2) and two STAs (STA1 and STA2). Each AP may transmit or receive data to/from the two STAs.

Some embodiments discussed herein are directed to Joint Multi-AP Transmission scenarios. The following description will describe some problems and technical solutions to solve the problems according to this application. The following description will first describe technical problems to be solved by this application.

Problem 1: some embodiments discussed herein relate to overhead in multi-AP transmission. With multi-AP communication networks, data to a STA may be transmitted from multiple APs at the same time in the downlink, and data from a STA may be transmitted to multiple APs at the same time in the uplink. To enable such capability, a STA may need to associate with multiple APs to enable multi-AP transmission/reception at the same time. The traditional AP-STA association protocol does not facilitate this, as each STA can only associate with one AP at a given time. Accordingly, it may be desirable to develop a more efficient method to achieve multi-AP association.

Figure 7:
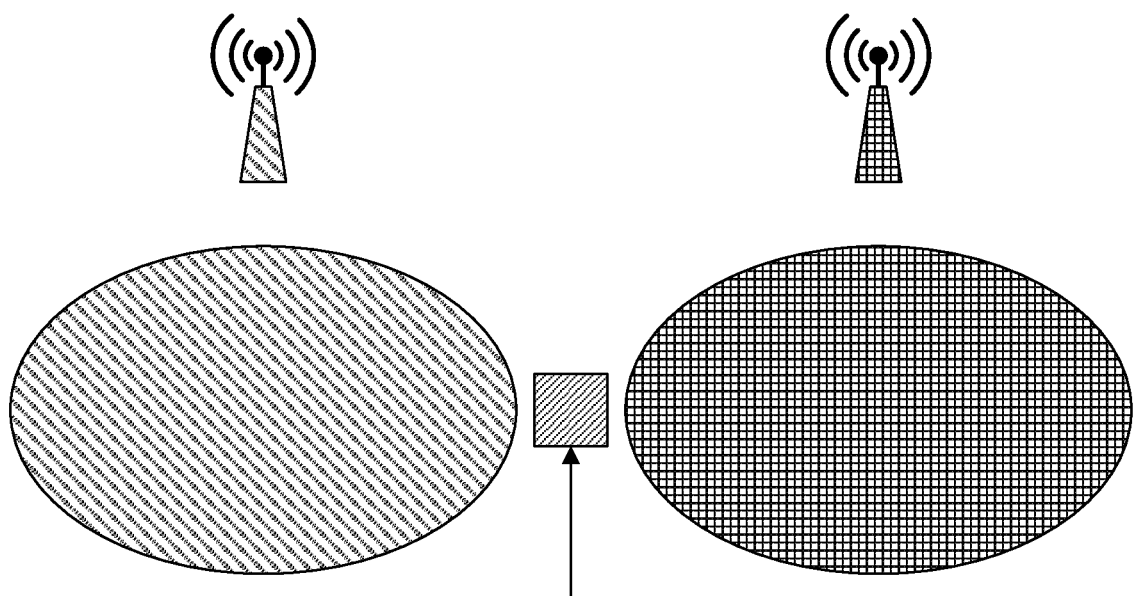
FIG. 7 illustrates an example scenario for beacon transmission coverage of cell edge STAs.

Problem 2: in some embodiments, multiple APs may coordinate to achieve higher peak throughput and increased efficiency as well as better BSS edge coverage (e.g., multi-AP schemes may be used to reach STAs in cell edge). Preferably, some embodiments may address fairness to and coverage of a cell edge STA. In a single AP scenario, a STA may normally only listen to a beacon from one AP, and STAs at the edge of the coverage area an AP may have difficulty in decoding normal Beacon transmissions. Accordingly, for multi-AP capability in a network, it may be desired to provide schemes and mechanisms to extend the coverage range for beacon transmission and reception. FIG. 7 illustrates an exemplary scenario for beacon transmission coverage of cell edge STAs. In FIG. 7, the arrow indicates a STA at the edge. In some implementations, the STA may be reached by joint transmission. In some implementations, the STA may or may not be able to receive normal beacons.

Problem 3: some embodiments discussed herein relate to time synchronisation (e.g., a TSF) when receiving from multiple APs. In multi-AP transmission, if a cell edge STA receives a joint transmission from all APs in the virtual AP set for a beacon frame at the same time, the time synchronization function at the STA may behave in the same way as a legacy STA. However, each AP has its own busy/idle medium status at target beacon transmission time (TBTT), and not all of the APs may be able to perform a joint transmission at the desired time. In this case, the transmission time of beacon frames from different APs may be staggered. Even if it is possible to transmit a joint transmission from all APs in a virtual AP set/multi-AP set, a cell edge STA may still not be able to receive it, e.g., due to local interference from an OBSS. In this case, it may be beneficial for APs to intentionally stagger their beacon transmissions in time for increased diversity, e.g., in terms of interference.

When beacons are transmitted at different time, Timestamp fields in them are supposed to be different. Given the rest of the contents are the same among the beacons in the same BI, different Timestamp fields creates different PSDUs. This prevents PHY method from effectively combining the signals.

In some embodiments, to overcome this, all APs may use the Timestamp of a particular beacon frame (e.g., the first beacon transmitted in the BI) in their transmitted beacon frame or frames. This may require both APs and STAs to be able to at least detect the transmission of this beacon frame however, and may require APs to be able to decode this particular frame. This approach may result in multiple beacons transmitted at different times. However, if a STA cannot detect the first beacon (e.g., due to a collision), then the timing synchronization function (TSF) is not updated in this beacon interval (BI) or it may be updated based on second or later beacons. This may hinder the objects of time diversity from transmitting multiple beacons in time, e.g., due to this weakness in the particular transmission at the moment of the timestamp.

Problem 4: some embodiments discussed herein relate to multi-AP spatial puncturing. Multi-AP transmission and reception may involve a group of APs transmitting to and receiving from STAs. In some cases, it may not be necessary for all APs in the group to join a particular transmission to or reception from a STA. In some implementations, the STA may facilitate the group of APs in a dynamic AP selection scheme such that only a subset of the APs is utilized.

Figure 8:
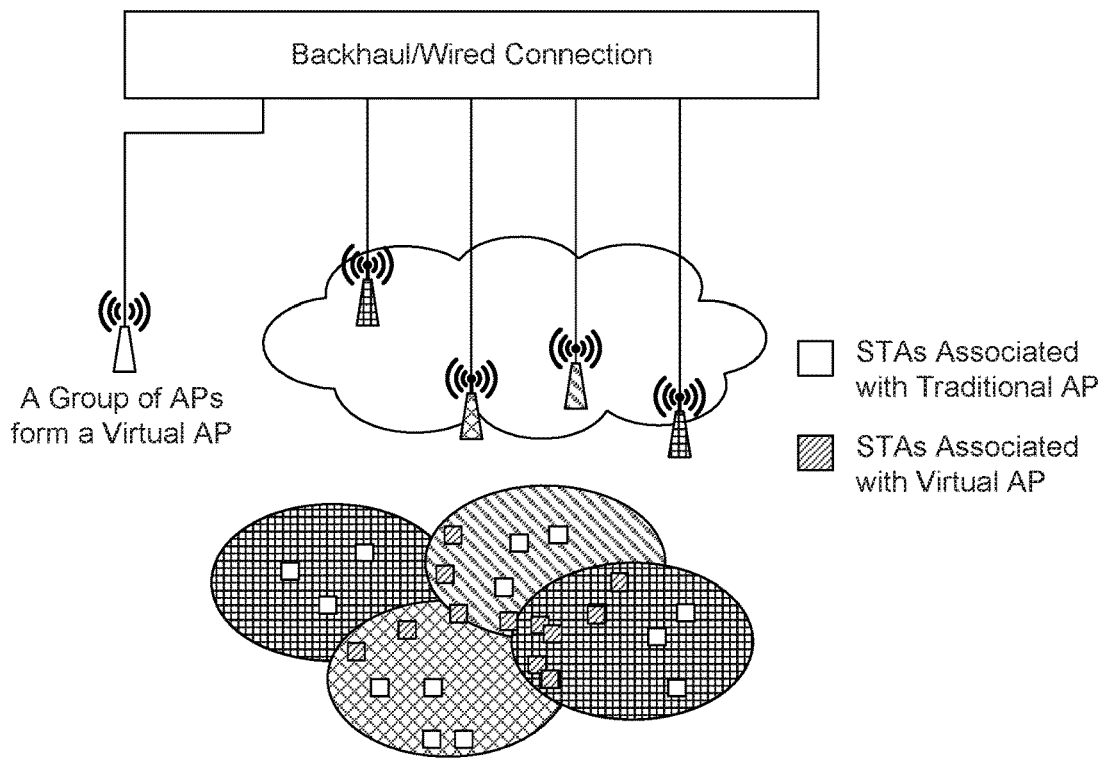
FIG. 8 illustrates an architecture where STAs can associate with an AP in the traditional way, or via a virtual AP.
Figure 9:
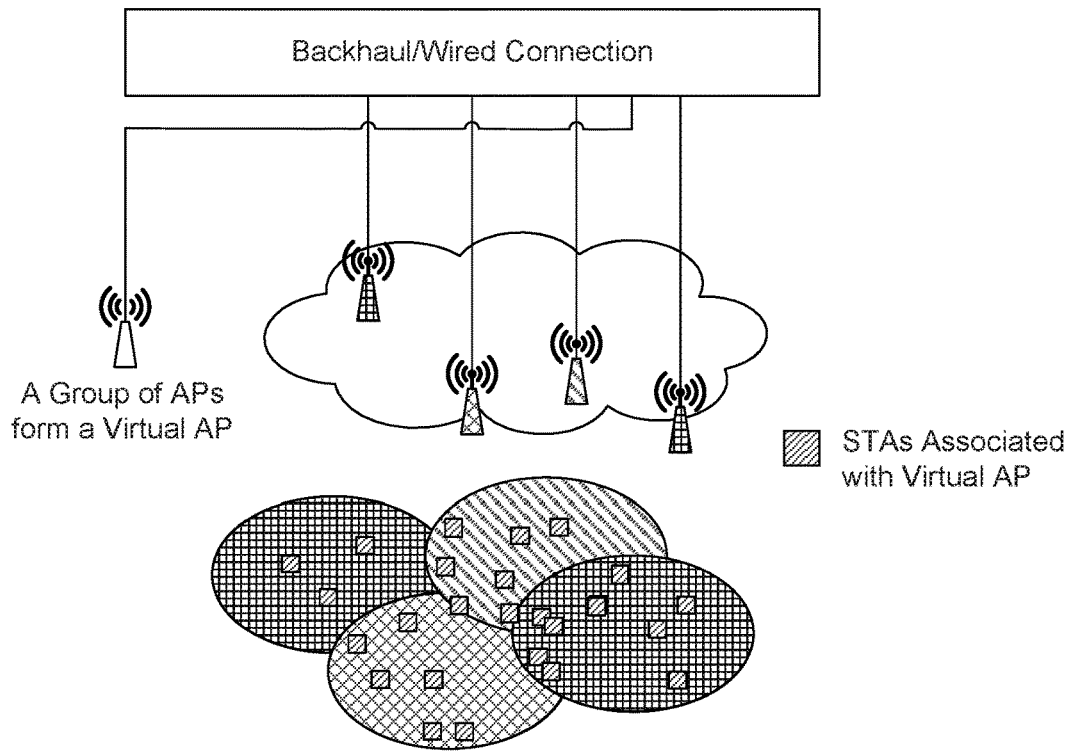
FIG. 9 illustrates an architecture where STAs associate with the virtual AP only.

The following description will first describe methods and procedures to solve the above-mentioned problem 1. That is, methods and procedures herein disclosed address the issues discussed above relating to overhead in multi-AP transmission. To enable multi-AP transmissions, multiple APs or a group of APs may form a "virtual AP" with a shared virtual basic service set identifier (vBSSID) and/or virtual service set identifier (vSSID). A STA may associate with the group of APs using the vBSSID and/or vSSID without knowing that it is a group of APs. FIG. 8 and FIG. 9 illustrate exemplary virtual AP architectures. FIG. 8 illustrates an architecture where STAs can associate with an AP in the traditional way, or associate with a group of APs via a virtual AP. FIG. 9 illustrates an architecture where STAs associate with a group of APs via a virtual AP only.

In the example of FIG. 8, each AP may have its own BSS. In addition, the group of APs may have a virtual AP. STAs may associate with the traditional single AP or with the virtual AP. As shown in FIG. 8, those STAs located at the edge of a BSS coverage area may associate with the virtual AP, and those STAs not located at a BSS coverage area may associate with an AP in the traditional way.

In the example of FIG. 9, each AP may not have its own BSS. The group of APs may have a virtual AP. STAs may associate with the virtual AP. In cases where multi-AP spatial puncturing is allowed, a STA may not always communicate with all the APs in the virtual AP group; rather, it may communicate with a subset of APs, and the rest of APs in the group may be considered as punctured.

A STA which associates with the virtual AP may have an association identifier (AID) assigned by the virtual AP. The group of APs may use this AID to refer the STA. In cases where a larger number of STAs associate with a virtual AP, the number of bits representing an AID may be increased. In some embodiments, a basic AID and an AID extension may be used to uniquely represent a STA in the BSS. The basic AID may be the same size as current AIDs discussed above, and the AID extension may be used if the number of STAs in the BSS is bigger than a threshold.

In DL virtual AP transmissions from a virtual AP to a STA, the traffic to the STA may be passed to all the related APs. The related APs may include all the APs in the virtual AP group, or a subset of APs used to communicate with the STA. In this way, the traffic may be readied for transmission from multiple APs to the STA. It should be noted that the above-mentioned embodiments regarding the DL virtual AP transmission is only given by way of example, and they are not intended to be exclusive or be limiting to the present application. The DL virtual AP transmission may be implemented in any other available ways as long as they may follow the principle and guideline discussed above.

In UL virtual AP transmission from a STA to a virtual AP, a packet (e.g., the received physical layer convergence protocol (PLOP) protocol data unit (PPDU)) transmitted from the STA may be received by all or a subset of the related APs. Each AP may process the packet partially and may pass the packet to a backhaul, where more PHY layer processes may be performed at the backhaul. In some embodiments, each AP may identify that the reception may involve multiple APs, and accordingly the AP may pass the packet to backhaul. The backhaul may perform combination of all received valid packets and decoding. In some embodiments, each AP may identify that reception may involve multiple APs, and accordingly the AP may perform channel estimation and demodulation, and pass the demodulated soft bits, (e.g., log likelihood ratio (LLR)), to a backhaul. The backhaul may perform LLR combination and channel decoding. In some embodiments, each AP may identify that the reception may involve multiple APs, and the AP may attempt to detect and decode the packet (e.g., PPDU). If the AP succeeds in detecting and decoding the packet, it may pass the decoded MAC packet to the backhaul; otherwise, it may pass the received packet or demodulated soft bits to the backhaul. It should be noted that the above-mentioned embodiments regarding the UL virtual AP transmission is only given by way of example, and they are not intended to be exclusive or be limiting to the present application. The UL virtual AP transmission may be implemented in any other available ways as long as they may follow the principle and guideline discussed above.

The figures and description above may assume a backhaul connection between the APs. However, the APs may be connected and controlled by a central controller or in any suitable manner. In the central controller case, the backhaul may be replaced by the central controller. The connection may be wired or wireless. In the case of a wireless connection, the connection may share the same band/channel as the BSS band/channel or may use a different band/channel.

The following technical solution is directed to solve the above-mentioned problems 1 and 2. That is, some embodiments disclosed below include multi-AP active scanning in order to solve the above-mentioned problems 1 and 2. An exemplary multi-AP active scanning procedure may proceed according to one or more of the following schemes.

An AP (which may be part of a Multi-AP set SSID, where the AP may be the master AP or a slave AP) may include one or more of the following information in its beacon, short beacon, FILS Discovery frame, and/or (broadcast) probe responses: Virtual BSSID, SSID, Multi-AP beacon schedule, Preferred Scanning methods, and/or Members of the same Multi-AP set. The above-mentioned information will be further described as follows.

A virtual BSSID may represent the entire multi-STA set SS. The Virtual BSSID may be used by the STA to send a Probe Request or Authentication or Association Request in order to obtain information or conduct authentication and/or association with the Multi-STA set SS.

An SSID may represent the entire multi-STA set SS. The SSID may be used by the STA to send a Probe Request or Authentication or Association Request in order to get information or conduct authentication and/or association with the Multi-STA set SS.

A Multi-AP beacon schedule may indicate the schedule by which beacons or multi-AP beacons, FILS discovery frames, Probe responses, may be transmitted concurrently or sequentially by one or more APs within the multi-AP set SS. The multi-AP beacon schedule may be indicated in terms of an offset to the TSF timer, which may also be included in the probe response, or an offset to the end of the current frame. The multi-AP beacon schedule may also or alternatively include the schedule of triggered multi-AP beacon frames, and/or multi-AP probe response frames, or FILS discovery frames.

Preferred Scanning methods may indicate the preferred method for scanning, including multi-AP active scanning, passive scanning, single AP active scanning, etc. Members of the same Multi-AP set may indicate one or more APs within the same Multi-AP set. Alternatively or additionally, the AP may include this information within the reduced neighbor report, or co-located or co-hosted APs, e.g., with an indication that it is within the same multi-AP set SS.

It should be noted that those above-mentioned information which may be included in an AP's beacon, short beacon, FILS Discovery frame, and/or (broadcast) probe responses is only given by way of example, and it is not intended to be exclusive or be limiting to the present application. Any other available information may be included as long as it may follow the above-discussed principle and guideline.

The above-mentioned information may be included in one or more of the following fields or elements: Multi-AP element, Reduced Neighbor Report, Neighbor report, Multi-band report, 6 GHz discovery element, and/or Out of band assistance Discovery element. The information may be transmitted in the bands or frequency channels other than the bands or frequency on which the beacon is transmitted. Other neighboring APs or BSSs may include such information overheard from other APs information, e.g., in their own Multi-AP element, Reduced Neighbor report, Neighbor report, or other fields.

A STA may initiate a multi-AP active scanning procedure by sending a probe request frame, which may include a Multi-AP Capability element. The Multi-AP Capability element may include a list of Multi-AP capabilities of which the STA is capable, e.g., multi-AP joint transmission, multi-AP MIMO, multi-AP MU-MIMO, multi-AP HARQ, multi-AP dynamic AP selection, multi-AP spatial puncturing, multi-AP spatial nulling, etc., in uplink and/or in downlink. The Multi-AP capabilities element may also indicate how many APs the STA is capable of supporting concurrently.

The Probe Request frame may include a SSID, BSSID or a virtual BSSID. The SSID, BSSID or virtual BSSID may be used to identify a multi-AP set. The scanning STA may have acquired the information regarding SSID, BSSID or virtual BSSID through a prior association, or through pre-acquired knowledge such as through FILS discovery frames, or from Neighbor Report or Reduced Neighbor Report, or through a 6 GHz discovery element, or an assistant discovery element that may be transmitted by another AP and/or co-hosted or co-located AP, or on a different channel or different band. The Probe Request frame may include an indication indicating that it is requesting a multi-AP probe response, or a multi-AP response, which may be included in the Multi-AP Capabilities element or Multi-AP Request element.

In cases where an AP is part of a Multi-AP set SSID, where the AP may be the master AP or a slave AP, it may respond to the Probe Request in the following way.

If the Probe Request includes a multi-AP capabilities element and/or a multi-AP request element, and if the probe request is not addressed to the SSID and/or the virtual BSSID that represents the entire Multi-AP set SS, the AP may respond with a Probe Response frame that may include a Multi-AP element. The Multi-AP element may include all information regarding the multiple APs in the same set, which may include one or more of the following: Virtual BSSID, SSID, Multi-AP beacon schedule, and/or Preferred Scanning methods. The above-mentioned information which may be included in the multi-AP element will be further described as follows.

The virtual BSSID may represent the entire multi-STA set SS. The Virtual BSSID may be used by the STA to send a Probe Request or Authentication or Association Request in order to get information or conduct authentication and/or association with the Multi-STA set SS.

The SSID may represent the entire multi-STA set SS. The SSID may be used by the STA to send a Probe Request or Authentication or Association Request in order to get information or conduct authentication and/or association with the Multi-STA set SS.

The Multi-AP beacon schedule may indicate the schedule at which beacons or multi-AP beacons, FILS discovery frames, Probe responses, may be transmitted concurrently or sequentially by one or more APs within the multi-AP set SS. The multi-AP beacon schedule may be in terms of offset that references to the TSF timer which may also be included in the probe response, or that references to the end of the current frame. It may also be the schedule of triggered multi-AP beacon and/or multi-AP probe response, or FILS discovery frames.

Preferred Scanning methods may indicate the preferred method for scanning, including multi-AP active scanning, passive scanning, single AP active scanning, etc.

It should be noted that those above-mentioned information which may be included in the multi-AP element is only given by way of example, and it is not intended to be exclusive or be limiting to the present application. Any other available information may be included as long as it may follow the above-discussed principle and guideline.

If the Probe Request includes a multi-AP capabilities element and/or a multi-AP request element and the probe request is addressed to the SSID and/or the virtual BSSID that represents the entire Multi-AP set SS, the AP may respond with a Probe Response frame or a trigger frame, e.g., as follows.

If the AP responds with a Probe Response frame, the Probe Response frame may include a Multi-AP element. The Multi-AP element may include all information regarding the multiple APs in the same set, which may include one or more of the following information as described before. It may subsequently trigger one or more probe response or beacon frames transmitted by one or more of APs in the same Multi-AP set SS. Additionally or alternatively, the AP may trigger a concurrent transmission of a Multi-AP beacon or multi-AP probe responses frame that may be addressed to the probing STA, or to a broadcast address. The triggering of concurrent or sequential Multi-AP beacon and/or probe responses may be following the multi-AP beacons schedule. If the AP responds with a trigger frame to one or more APs in the same multi-AP set, the AP may trigger a concurrent transmission of a Multi-AP beacon or multi-AP probe responses frame that may be addressed to the probing STA, or to a broadcast address. The triggering of concurrent or sequential Multi-AP beacon and/or probe responses may follow the multi-AP beacon schedule. The Multi-AP beacon or Multi-AP probe response frame may be shared by the master AP to all other APs in the same Multi-AP set SS. It should be noted that the above-mentioned ways to response with a Probe Response frame or a trigger frame are only given by way of example, and they are not intended to be exclusive or be limiting to the present application. Any other available way may be used as long as they may follow the above-discussed principle and guideline of this application.

The STA, after receiving a Probe Response frame which may include a multi-AP element, may follow an instruction included in the Probe Response frame to conduct further scanning and/or authentication/association. For example, if the Preferred Scanning Method is indicated as Multi-AP Active scanning, the STA may send a Probe Request to the SSID and/or virtual BSSID representing the Multi-AP set SS, which may also include Multi-AP element and/or Multi-AP request element. If the Preferred Scanning Method is indicated as passive scanning, the STA may follow the multi-AP beacon schedule to receive the one or more beacons, probe responses, FILS discovery frame, and/or triggered beacons, probe responses and FILS discovery frames. If the Preferred Scanning Method is indicated as single-AP active scanning, the STA may send a probe/authentication/association request to one or more APs that are included in Probe Response frames, or pre-acquired information.

The following technical solution is directed to solve the above-mentioned problems 1 and 2. Some embodiments disclosed below include a multi-AP beacon. The multi-AP repetition beacon frame may be transmitted from a group of APs. In some embodiments, it is assumed that multiple APs may group together, and that backhaul connections are available among the multiple APs. In some embodiments, the multiple APs or the AP group may form a virtual AP, and the APs may share a common virtual BSSID (vBSSI) and/or virtual SSID (vSSID) when they transmit the multi-AP repetition beacon frames. In some embodiments, the multiple APs may form a group, and a master AP may control the group, or a central controller may control the group. The group of APs may transmit the multi-AP repetition beacon using a common BSSID assigned by the master AP or a Multi-AP central controller.

The multi-AP repetition beacons transmitted from the group of APs may have the same MAC body and modulation and coding schemes, such that a STA may combine the received signal. An indicator may indicate the repetition transmission such that the receiver may combine them. For example, a multi-AP repetition transmission field may be set, e.g., in a PLOP header, or MAC header or beacon frame, such that receiving STAs may combine the received signal.

Multiple embodiments regarding the multi-AP beacon transmission are shown in FIGS. 10-14. The following description will describe each of these embodiments in detail.

Figure 10:
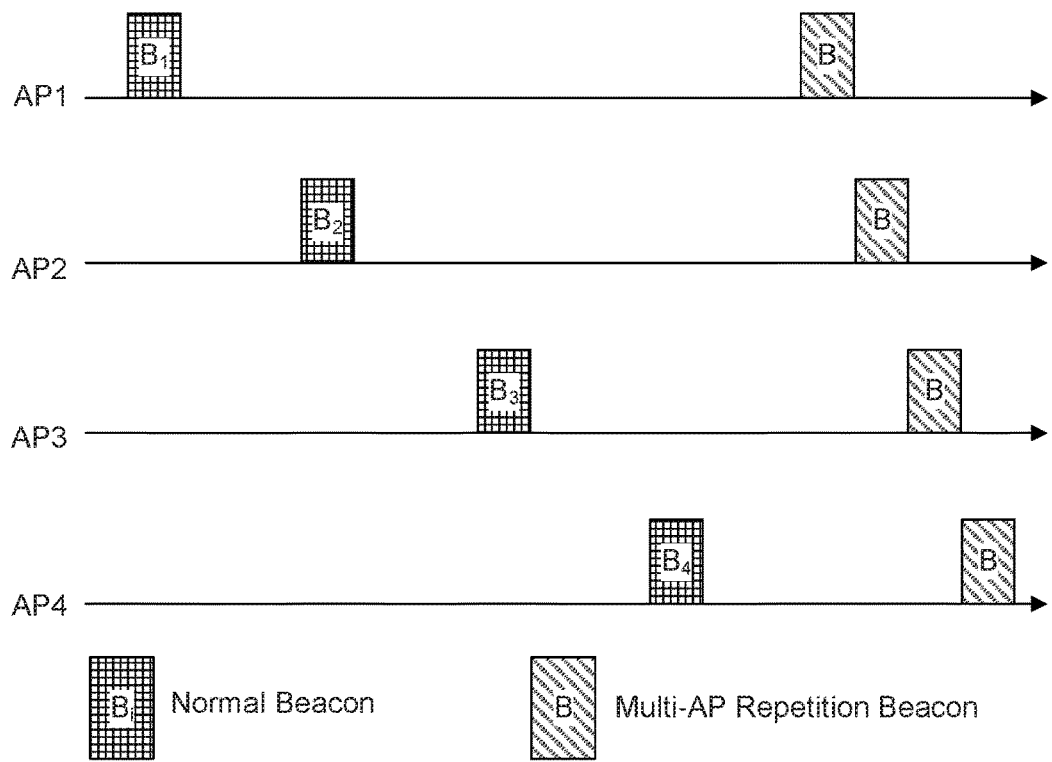
FIG. 10 illustrates multi-AP repetition beacons transmitted sequentially in different time slots.

FIG. 10 illustrates multi-AP repetition beacons transmitted sequentially in different time slots. In this example, each AP may still transmit its own Beacon for its BSS, which is shown as a normal Beacon in the figure, so that the STAs may choose to associate with those individual APs first and, depending on their capability to support Multi-AP transmission, may decide whether or not to associate with the multi-AP group later. As shown in FIG. 10, AP1 may transmit normal beacon B1; AP2 may transmit normal beacon B2; AP3 may transmit normal beacon B3 and AP4 may transmit normal beacon B4. The multi-AP repetition beacons (B shown in FIG. 10) may be transmitted sequentially by the group of APs.

In some embodiments, a leading AP may start the multi-AP repetition beacon transmission. The rest of APs in the group may follow xIFS (any inter-frame spacing, e.g., short IFS (SIFS), point coordination function (PCF) IFS (PIFS), distributed coordination function (DCF) IFS (DIFS), etc.). The transmission order may be negotiated when the AP join the group. Alternatively, the transmission order may be determined by geometry location of the APs, MAC addresses, time to join the group etc.

Figure 11:
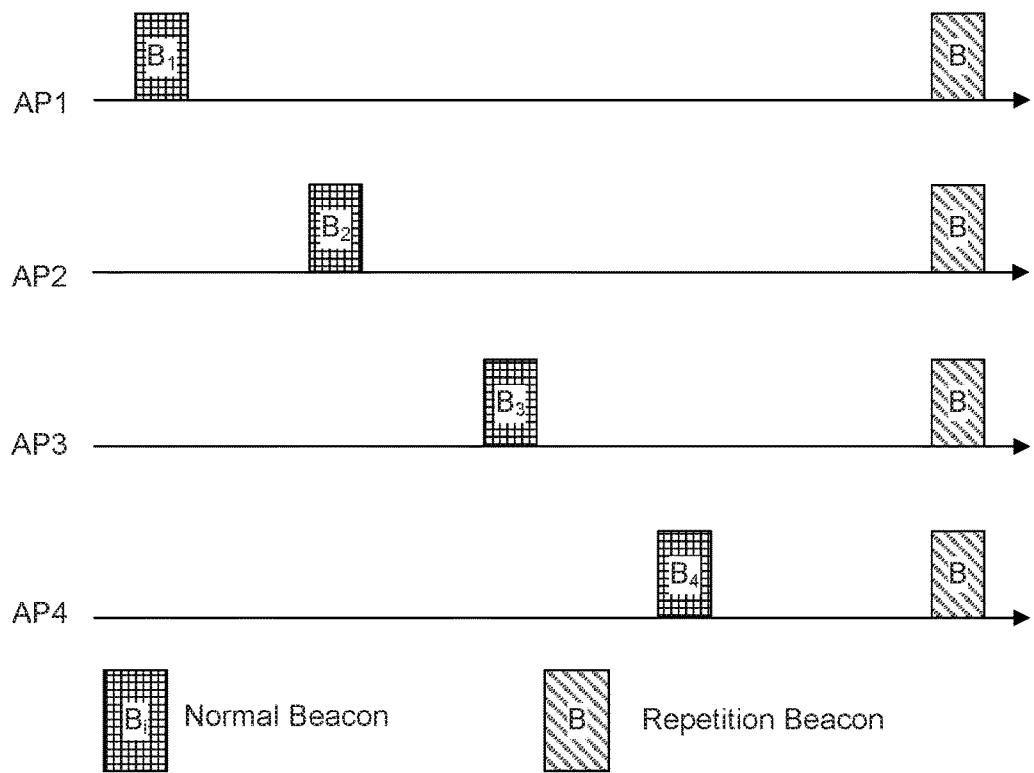
FIG. 11 illustrates multi-AP repetition beacons transmitted concurrently.

FIG. 11 illustrates multi-AP repetition beacons transmitted concurrently. In this example, each AP may still transmit its own normal beacon for its BSS sequentially, which is shown as a normal beacon (e.g., B1, B2, B3, and B4) in FIG. 11. The multi-AP repetition beacons (B shown in FIG. 11) may be transmitted concurrently by the group of APs. The transitions of the multi-AP repetition beacons may be exactly the same and well synchronized so that STAs may be able to decode them.

Figure 12:
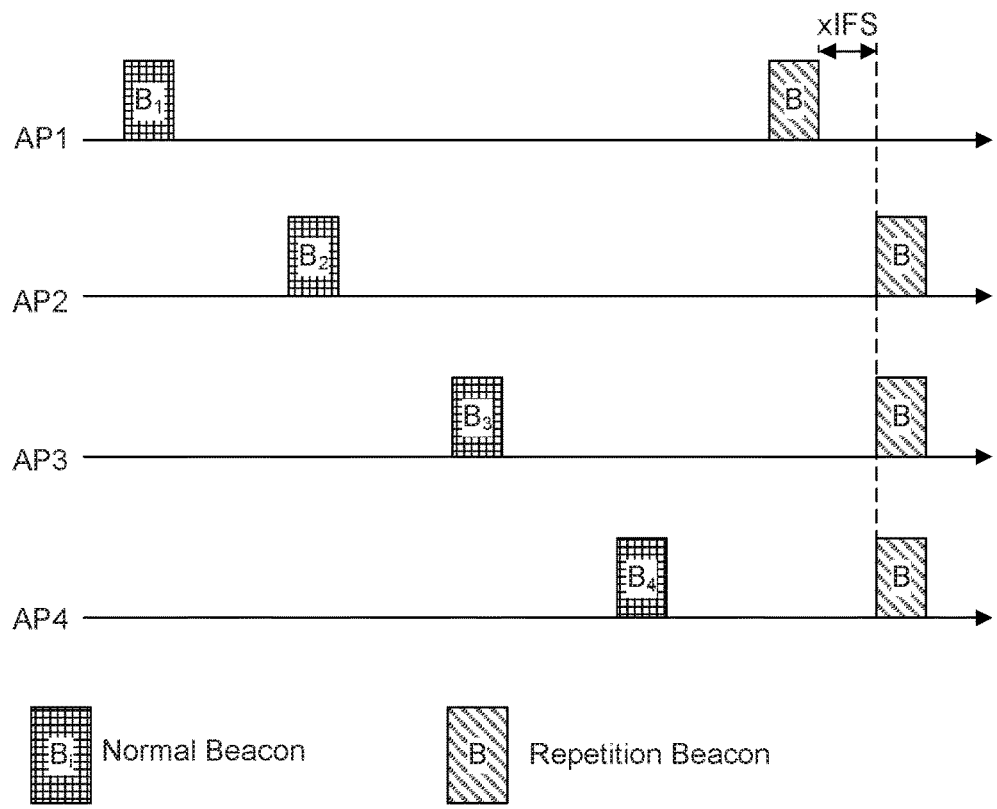
FIG. 12 illustrates an example where the leading AP may start the multi-AP repetition beacon transmission.

FIG. 12 illustrates another approach, where the leading AP (e.g., AP1) may start the multi-AP repetition beacon transmission first. The rest of the APs in the group may transmit the multi-AP repetition beacon frames concurrently an xIFS duration after reception of the leading AP transmission. In this method, the leading AP transmission may be considered as a trigger frame to trigger the multi-AP concurrent beacon transmission. In this approach, the APs in the group may transmit their own normal beacons (e.g., B1, B2, B3 and B4) sequentially as shown in FIG. 12.

Figure 13:
FIG. 13 illustrates an example where the leading AP may transmit a multi-AP beacon trigger frame.

FIG. 13 illustrates another example approach, where the leading AP (e.g., AP1) may transmit a multi-AP beacon trigger frame (i.e., T shown in FIG. 13). All the APs in the group may transmit multi-AP repetition beacon frames concurrently an xIFS duration right after the trigger frame.

Figure 14:
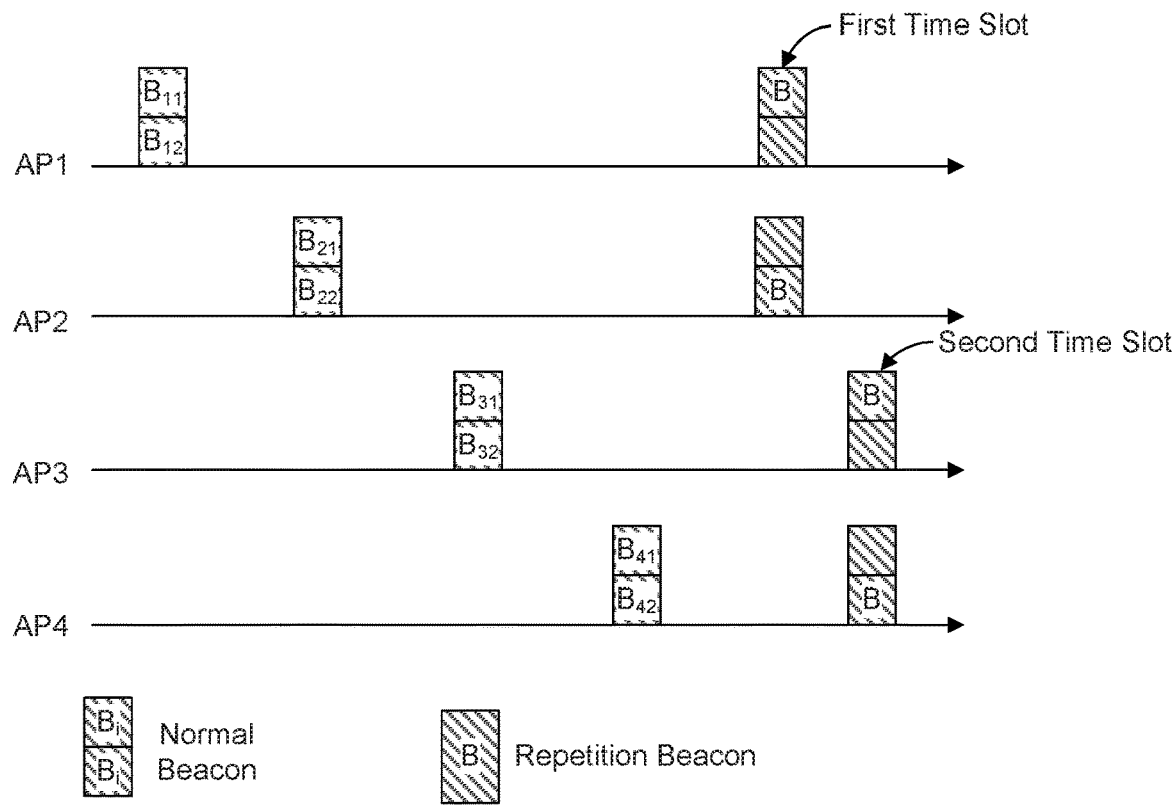
FIG. 14 illustrates an example sequential transmission scheme with multiple channels.

The multi-AP repetition beacons may be transmitted over multiple channels if those channels may be idle. Both sequential and concurrent transmission may be generalized to multiple channel transmission case. FIG. 14 illustrates an example of such sequential transmission scheme. As shown in FIG. 14, each AP may still transmit its own normal beacon for its BSS, which may be shown as normal beacon in FIG. 14, i.e., B11, B12, B21, B22, B31, B32, B41, and B42. The multi-AP repetition beacons may be transmitted sequentially on two channels in this example in a non-overlapping format. AP1 may transmit multi-AP repetition beacon over channel 1 in the first time slot shown in FIGS. 14, and AP2 may transmit it over channel 2 in the first time slot. Similarly, AP3 and AP4 transmit their multi-AP repetition beacons in the second time slot over channel 1 and channel 2 respectively. Alternatively, the leading AP may need to transmit a frame right before the set of multi-AP repetition beacon transmissions to let the APs synchronize. The frame may be a trigger frame or a beacon frame. It should be noted that the above-mentioned embodiment shown with reference to FIG. 14 is only given by way of example, and it's not intended to be exclusive or be limiting to the present application. Multiple APs may transmit their multi-AP repetition beacons in any other different ways associated with different time slots and different channels. For example, AP1 may transmit its multi-AP repetition beacon over channel 1 in the second time slot, and AP2 may transmit its multi-AP repetition beacon over channel 2 in the second time slot, and accordingly, AP3 may transmit its multi-AP repetition beacon over channel 1 in the first time slot, and AP4 may transmit its multi-AP repetition beacon over channel 2 in the first time slot.

At the end of the association process, a STA may associate with one group of APs in one channel and associate with another group of APs in another channel. Some of those APs in two groups may be physically the same. STAs may need to report back to the network about which APs they can hear on which channel. The network then can complete the association process using available resources, including physical APs and channels.

In some such methods, it may be assumed that each of the group of APs is available to transmit beacons at the same time. In some such methods, it may be assumed that the leading AP may transmit and reserve the channel(s), and the rest of APs may follow the transmission an xIFS duration after.

Figure 15:
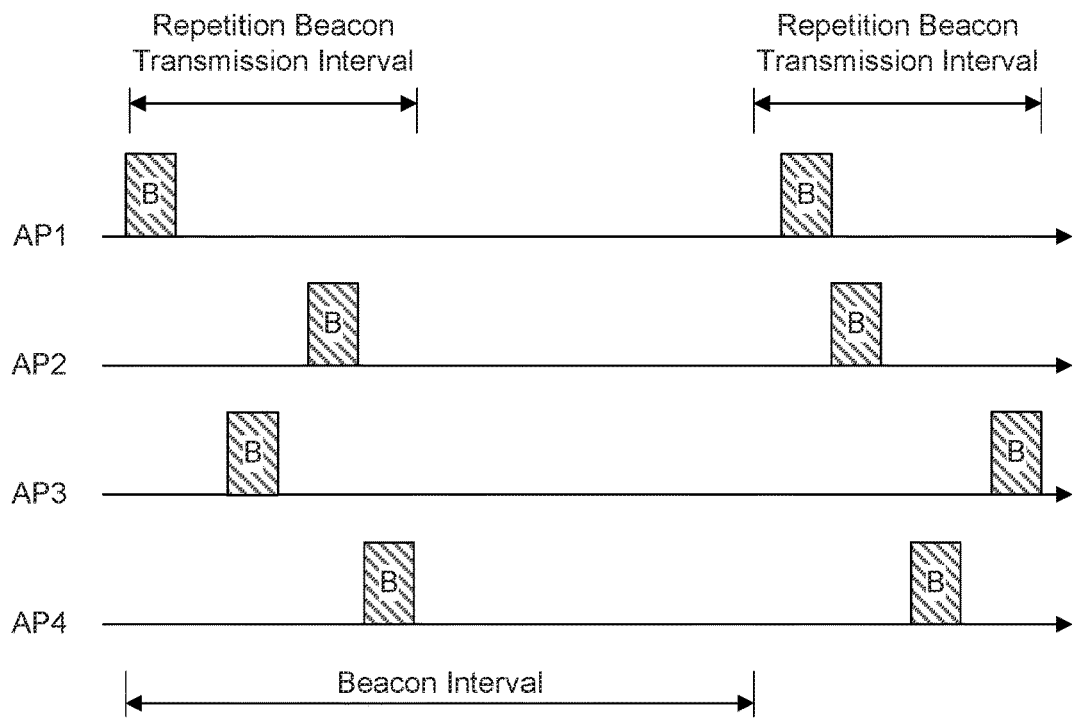
FIG. 15 illustrates an example of flexible repetition beacon transmissions with repetition beacon transmission interval.

In cases where not all APs in the group are available to transmit either sequentially or concurrently, e.g., due to hidden nodes or untruncated transmissions, an approach, such as the one illustrated in FIG. 15, may be applied. As shown in FIG. 15, a repetition beacon transmission interval may be predefined or predetermined and known by STAs and APs. All the APs in the group may transmit multi-AP repetition beacons within the repetition beacon transmission interval once they may be available. In some embodiments, the APs in the group may not transmit a traditional beacon (their own beacon) in the interval. The repetition beacon transmission interval may be defined in one or more methods, such as a static method, a semi-static method, and/or a dynamic method. These three methods will be described with reference to detailed embodiment as follows.

In a static method, the repetition beacon transmission interval may be defined with fixed starting location and duration. The starting location and duration of the interval may be predefined or predetermined, or announced in previous multi-AP repetition beacons. In an embodiment, the duration may be defined using a real time unit, such as a microsecond. In another embodiment, the duration may be defined as a fractional of the beacon interval. The beacon interval may be defined as the duration between two different sets of repetition beacons as shown in FIG. 15.

In a semi-static method, the repetition beacon transmission interval may be defined with a fixed duration, but with a dynamic starting location. That is, a starting location when an AP may transmit its first frame in multi-AP repetition beacon transmission sequences may not be a fixed location. The AP may be a leading AP. The first frame may be a beacon frame or a trigger frame. The duration of the repetition beacon transmission interval may be predefined or predetermined, or announced in previous multi-AP repetition beacons.

In a dynamic method, the repetition beacon transmission interval may be defined as having both a dynamic starting location and a dynamic duration. The starting location may be the time when an AP transmits its first frame in multi-AP repetition beacon transmission sequences. The interval duration may be adjustable due to density of the STAs in the BSS(s) or the virtual BSS. For example, in a densely deployed system, more transmissions and hidden nodes may be expected and a longer interval may be beneficial. Otherwise, a shorter interval may be used. The duration of the interval may be announced in previous multi-AP repetition beacons. In cases where no duration is explicitly signaled, STAs and APs may reuse the same duration.

It should be noted that the above-mentioned three exemplary methods to define the repetition beacon transmission interval are only given by way of example, and they are not intended to be exclusive or be limiting to the present application. There might be other available methods to define the repetition beacon transmission interval as long as those methods follow the principle and guideline discussed above.

A STA may expect to receive repetition beacons within a time interval. In some implementations, the time interval may be predefined/predetermined/signaled by the AP. In some implementations, the time interval may be determined based on a STA procedure. The time interval may be defined as having a starting location (t0) and duration (T). The duration may be determined, e.g., using previously received repetition beacons or predefined, e.g., by a standard. The starting location may be determined, e.g., by previously received repetition beacons or predefined by standard in fixed location cases. In a dynamic starting location case, the starting location may be determined when the STA detects the first frame of the repetition beacon transmissions. For example, in dynamic starting location cases, the STA may have encountered a chance to mis-detect the starting location (e.g., t1). The STA may then monitor the repetition beacon transmission interval from mis-detected starting location [t1, t1+T].

The STA may start a repetition beacon timer at the starting location t0. If the timer is less than duration T, the STA may continue monitoring the channel(s) for repetition beacon transmissions. The STA may detect a frame transmission. By checking the PLOP header or control trailer or other type of separately encoded part of the frame, the STA may obtain a transmitter identity, such as MAC address, compressed MAC address, BSSID, compressed BSSID, BSS color, etc. The STA may recognize that this may be a repetition transmission or HARQ transmission, e.g., by detecting a repetition transmission field set to 1. If this is the first frame within the interval from the same transmitter ID, the STA may decode it. If decoding fails, the STA may save it in the buffer. If this is not the first frame from the same transmitter ID, the STA may combine it with the data saved in the buffer. If it is not successfully decoded, the STA may save the combined data in the buffer and continue monitoring the channel(s). If the timer is greater than duration T, the STA may clear the buffer.

STAs, which may be associated with the BSSID carried by multi-AP repetition beacon, may be considered as STAs that may communicate with the group of APs or the virtual AP. In a repetition beacon transmission, the AP group or the virtual AP may choose a modulation and coding scheme (MCS) which may be supported by all of the STAs. The MCS selected may be higher than the lowest MCS supported. While various approaches herein are discussed with respect to repetition beacon transmission schemes, similar ideas may be applied to probe response frame and association response frame transmissions. Information elements and fields have been discussed in other embodiments. It is noted that in each of the FIGS. 10-14, each AP in the group may transmit one multi-AP repetition beacon in a beacon interval. However, this may be easily extended to a general case where each AP may be allowed to transmit 0 to N repetition beacons in a beacon interval. In an example case, the AP group may contain only one AP, and the AP may still transmit multiple repetition beacons in a beacon interval. It is noted that the terms repetition beacon, multi-AP repetition beacon, and multi-AP beacon may be used interchangeably. In FIGS. 10-14, Beacon frames may be used to demonstrate the repetition transmission from multiple APs. The schemes may be easily extended by using other control/management/ data frames. For example, Beacon frame may be replaced by sounding frames, high reliable data transmission frames etc.

The following technical solution is directed to solve the above-mentioned problems 3. Some embodiments address a TSF for the repetition beacon. Some such embodiments may address time synchronization issues when receiving from multiple AP. In this example, it is assumed that APs in a virtual AP set have their TSF synchronized, and that a multi-AP repetition beacon transmission procedure is used.

In some embodiments, the TSF can be signaled in the preamble of each beacon, such that each repetition has its own self-contained TSF timer. The timestamp field may be 8 bytes, which may increase the preamble size. The increased size may reduce the range and reliability of the preamble, preventing repetition beacon from being detected by a cell edge STA. Accordingly, in some embodiments, signal target beacon transmission time (TBTT) is in the beacon frame instead of the timestamp of the beacon. The preamble is used to signal the time offset between the repetition beacon and the TBTT. In this approach, the preamble of repetition beacon_i, may provide the receiver with an offset between TBTT and the time of the beacon_i, as $t\_i$. After single or combining multiple repetition beacons, the content of the beacon is decoded, and value of TBTT is known to the receiver. Based on $t\_i$ and receivers internal clock at the time of receiving beacon_i, the receiver will be able to map TBTT to its own internal clock.

Figure 16:
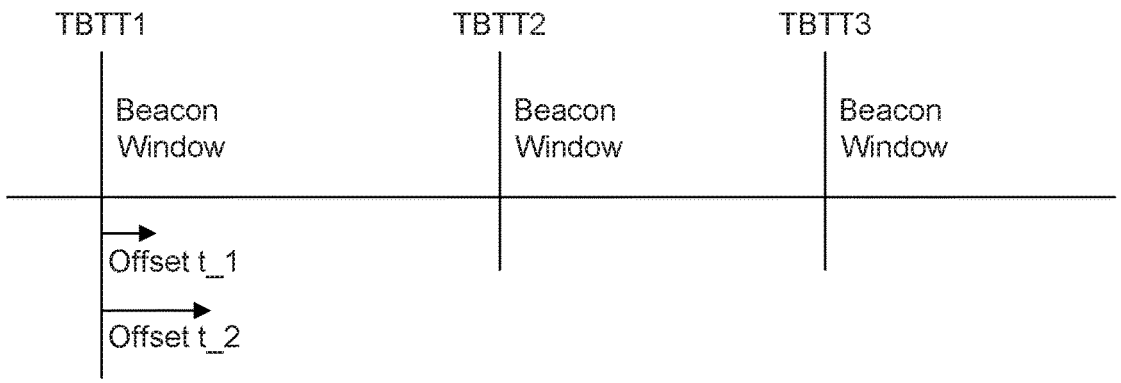
FIG. 16 illustrates an example TBTT/beacon window and t_i.

Some such embodiments have the advantage that every repetition beacon in the same BI has the same TBTT value in the payload, and accordingly, repetition beacons can be combined (e.g., like HARQ transmissions). Furthermore, the repetition beacons of the same BI must finish transmission within a beacon window after the TBTT, so the range of $t\_i$ is bounded by the beacon window or repetition beacon transmission interval defined in the above paragraphs regarding the multi-AP beacon. This window may be smaller than the range of Timestamp value. Accordingly, offset $t\_i$ may be more suitable to be carried in the preamble of each repetition beacon. The $t\_i$ may be conceptualized as the least significant bits (LSBs) or most significant bits (MSBs) of the 64 bit Timestamp of each repetition beacon. For example, if the beacon window is 10 ms, an example $t\_i$ may be roughly the 14 LSB of the Timestamp. FIG. 16 illustrates an example TBTT/beacon window and $t\_i$. It should be noted that the above-mentioned beacon window and Timestamp are only given by way of example, and they are not intended to be exclusive or be limiting to the present application.

Some embodiments include further optimization to further reduce the information representing $t\_i$. In some embodiments, $t\_i$ is quantized with a granularity of $\Delta t$. For example, if $\Delta t = 64$ us, and a beacon window is 10 ms, then Li can be represented by 8 bits in the preamble. This may produce an ambiguity (e.g., a 64 us ambiguity in this example). One approach to resolving this ambiguity is to mandate AP to always start or end the repetition beacon transmission at the boundary of $\Delta t$ interval, and $t\_i$ indicates the time from TBTT to the start or the end of the repetition beacon. Starting or ending at $\Delta t$ interval each present various challenges.

Starting at the boundary may limit the channel access opportunity, e.g., because the boundary may coincide with a medium busy period, while non-boundary duration coincides with the medium idle time. To increase the channel access opportunity, in some embodiments, a reservation signal may be used. For example, reservation signals (or dummy signals) may be inserted before (e.g., immediately before) the real beacon transmission such that the channel is occupied. The real beacon transmission may start from the boundary of $\Delta t$ interval. However, the length of the reservation signal may not be an integer multiple of OFDM symbols. Similarly, ending at the boundary may require padding to be applied, and the padding may not be an integer multiple of OFDM symbols.

Figure 17:
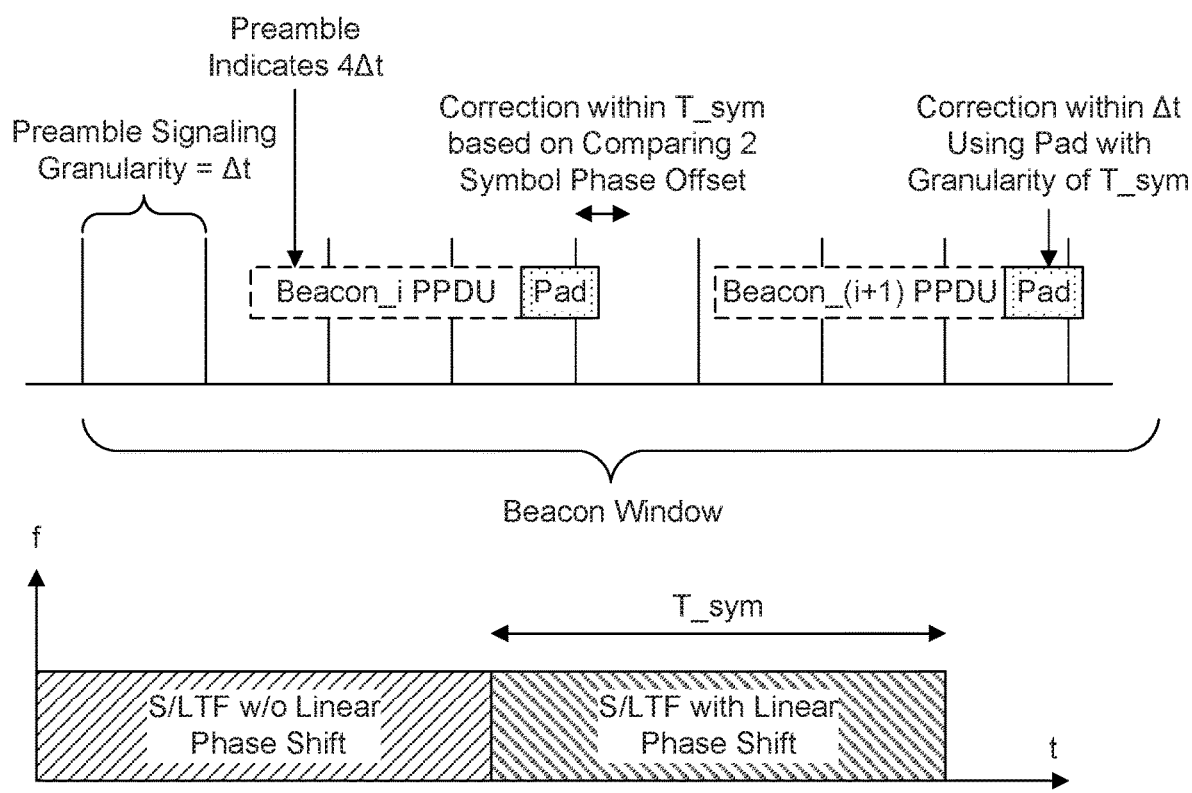
FIG. 17 illustrates an example reservation/pad signal.

FIG. 17 illustrates an example approach to resolving this ambiguity, while preserving the reservation/pad signal to be integer multiple of OFDM symbols. These symbols can be used to carry extra parity bits or training fields to protect the PPDU, unlike an arbitrary length busy signal which cannot be utilized by the receiver.

As shown in FIG. 17, the pad is shown at the end of the PPDU. Alternatively, the pad may be placed at the beginning of the PPDU to be used as a reservation signal. Alternatively, the pad may be placed in a pre-defined location in a PPDU. The pad may be used to make the end (or start) of the PPDU be within 1 OFDM symbol at the nearest $\Delta t$ interval boundary. In some embodiments, the PPDU length signalled in the preamble is the length to the end of pad. The extra information in the pad may include additional parity bits or training symbols. In some embodiments, the PPDU length signalled in the preamble is the length to the end of pad, but there is no signal actually transmitted in pad.

To resolve the ambiguity within an OFDM symbol, one or more pairs of short training field (STF) or long training field (LTF) symbols can be used, e.g., one without any phase adjustment, the other having a linear phase shift corresponding to the time offset between the end of pad symbol and the nearest $\Delta t$ interval boundary. Based on the linear phase shift difference between the two symbols, the receiver may determine the time of the nearest $\Delta t$ interval boundary, from the end time of the pad. From the time of the nearest $\Delta t$ interval boundary, the receiver may use a quantized $t\_i$ (which is an integer multiple of $\Delta t$, $4\Delta t$ in the example below) from the preamble to derive TBTT. In some embodiments, the pad duration is fixed and can be one or more pairs of special and/or longer LTF, which has $T\_sym=\Delta t$. In this case, the PPDU may no longer need to be padded with an integer number of normal OFDM symbols to the closet $\Delta t$ interval boundary. This may enable a direct estimation of packet start/end time to the nearest $\Delta t$ interval boundary. In various embodiments, some of the time related parameters, such as offset $t\_i$, quantized $t\_i$, are included in preamble. Alternatively, they may be included in any other separately encoded and CRC protected part.

The following technical solution is directed to solve the above-mentioned problem 4. Some embodiments address multi-AP spatial puncturing transmission. In some embodiments, multi-AP transmission and reception may involve a group of APs transmitting to and receiving from STAs. In other embodiments, multiple APs may form a group of APs or a virtual AP to communicate with STAs. It may not be necessary for all APs in the group to join a particular transmission to or reception from a STA, or it may not be efficient to use all of the APs in the group to communicate with a STA. In some implementations, the STA may facilitate the group of APs in a dynamic AP selection scheme (e.g., a multi-AP spatial puncturing transmission scheme) such that only a subset of the APs is utilized. In other words, a multi-AP spatial puncturing transmission scheme may be used, e.g., to enable a subset of APs in the group to transmit to and/or receive from a STA. In that case, a STA may communicate with a subset of APs and the rest of APs in the group may be considered as punctured. That is, some APs in the group which will not communicate with the STA may be considered as 'punctured' from the communication in the spatial domain.

To enable spatial puncturing transmission, the AP group or the virtual AP may determine the subset of APs to use for communication with the STA. In some embodiments, a modified multi-AP repetition beacon transmission scheme is used for the STA to measure the received signal power from each AP, and provide feedback to the AP group or the virtual AP. The following description will describe such multi-AP repetition beacon transmission scheme according to preferred embodiments of this application with reference to FIG. 18 and FIG. 19. Note, we use multi-AP repetition beacon transmission scheme as example. It may be extended to multi-AP repetition transmission schemes by using any other frames, such as management frames, control frames or data frames, instead of beacon frames.

Figure 18:
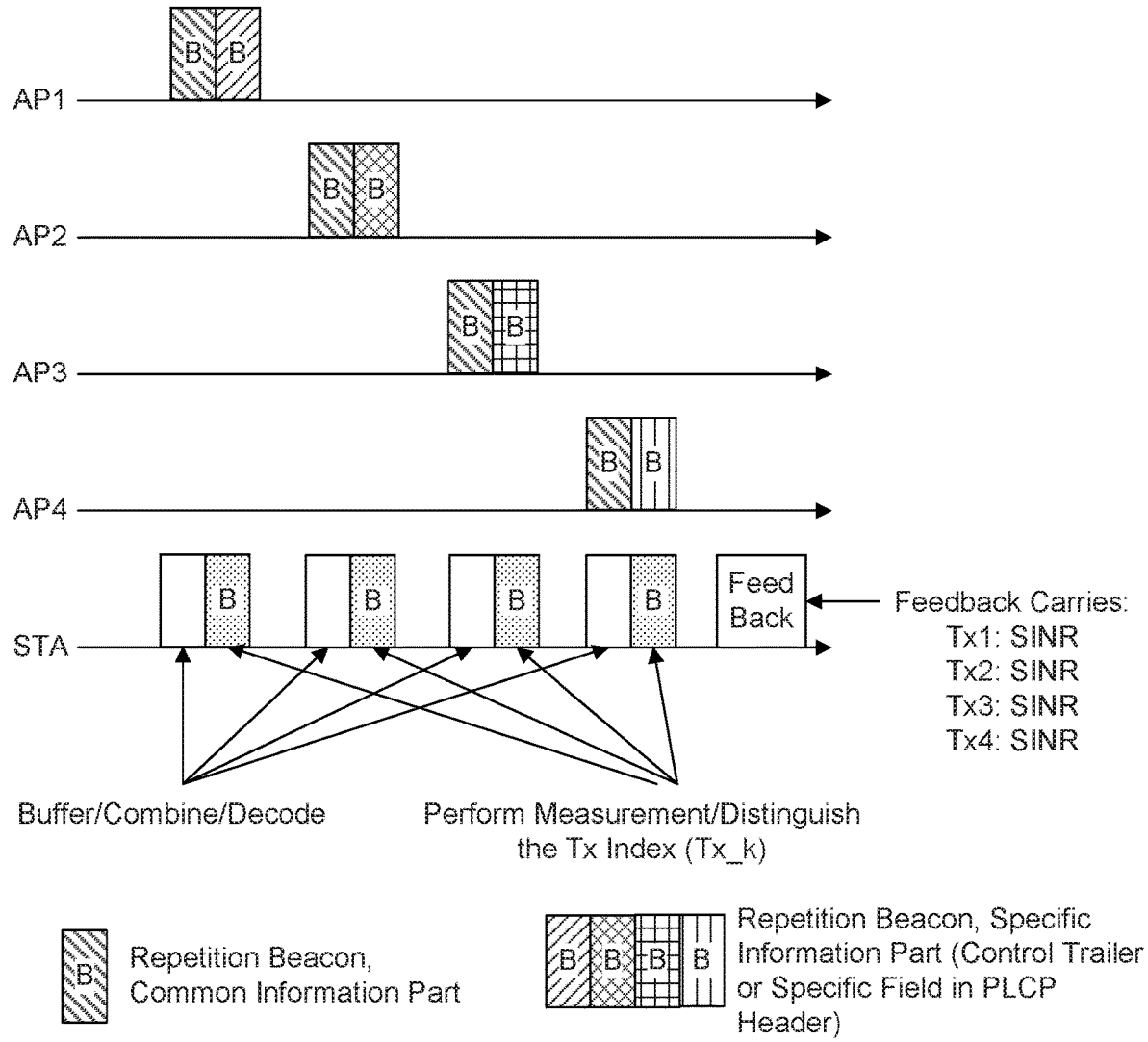
FIG. 18 illustrates example repetition beacon measurement and feedback.

FIG. 18 illustrates overall processes of a multi-AP repetition beacon transmission scheme according to an embodiment of this application. As shown in FIG. 18, it is assumed that AP1, AP2, AP3 and AP4 coordinate to form a multi-AP transmission/reception group or multi-AP transmission set or a virtual AP. Each of the APs may transmit a repetition beacon including both a common information part (i.e., a common part shown in FIG. 18) and an AP-specific information part (i.e., a specific part shown in FIG. 18). Therefore, as shown in FIG. 18, there are four common information parts in total, and four AP-specific information parts in total. The common information parts are transmitted, or assumed to be transmitted (and received) from multiple APs and may be identical to enable combining and decoding at the STA. The AP-specific information parts that may be transmitted (and received) differ from AP to AP to enable the STA to identify a specific AP transmitting the AP-specific information part or perform AP specific measurements (discussed below). Based on the decoding of the common information parts and the AP-specific information parts, the STA may provide feedback information to the multi-AP transmission set (i.e., the multi-AP group) to assist future multi-AP transmissions; e.g., AP and STA selection, multi-AP scheme, MCS, power etc. The common information part and the AP-specific information parts may be separately encoded and protected using different CRCs.

It should be noted that the FIG. 18 only illustrates overall processes of an exemplary multi-AP repetition beacon transmission scheme, and its detailed embodiments will be described below with reference to FIG. 19. In this application, unless otherwise indicated, the terms "common information part" and "common part" may be used interchangeably, and the terms "AP-specific information part" and "AP-specific part" may be used interchangeably.

It should be noted that in some embodiments, the common information part may also be referred to as "common beacon" and the AP-specific information part may also be referred to as "AP-specific beacon". The repetition beacon may actually be transmitted by two separate parts: one is used for common information part, and another is used for AP-specific information part. For example, in a scenario, the common information part and the AP-specific information part may be transmitted separately. In that case, the common information part may be referred to as "common beacon", and the AP-specific information part may be referred to as "AP-specific beacon."

Preferably, in each repetition beacon, the common information part and the AP-specific information part may be transmitted together with an interframe spacing between them. In that case, the common information part may also be referred to as "common beacon", and the AP-specific information part may also be referred to as "AP-specific beacon." Therefore, the terms which could be used for different parts (i.e., the common part and the AP-specific part) of the repetition beacon may vary according to different embodiments.

Figure 19:
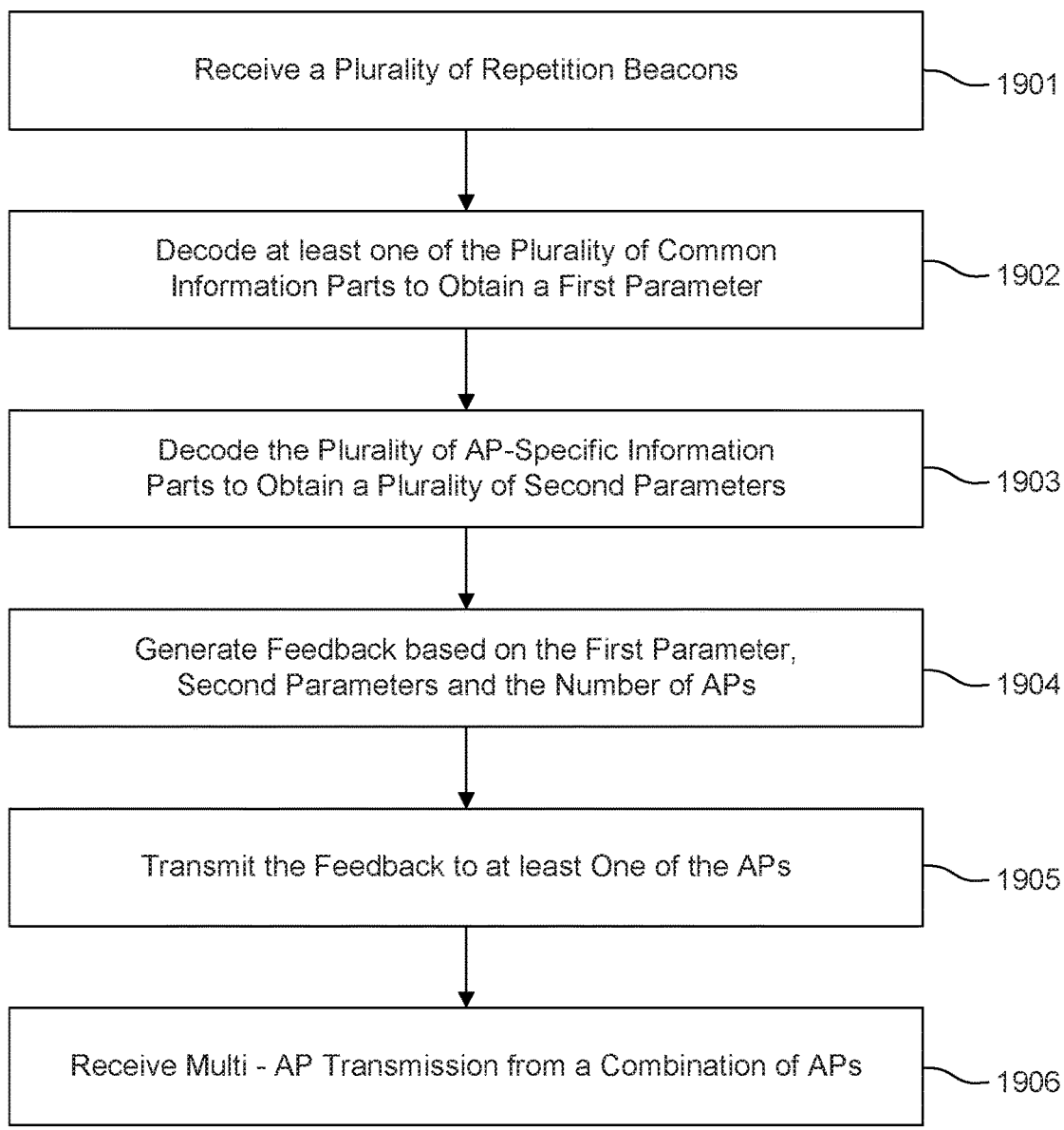
FIG. 19 illustrates an example flow chart of a method according to an embodiment of this application.

FIG. 19 illustrates a flow chart of a method 1900 for multi-AP transmission according to this application. As shown in FIG. 19, the method 1900 comprises: at 1901, receiving a plurality of repetition beacons, one from each of a plurality of APs, each of the plurality of repetition beacons comprising a common information part and an AP-specific information part; at 1902, decoding at least one of the plurality of common information parts or a combination of one or more common information parts to obtain a first parameter; at 1903, decoding the plurality of AP-specific information parts to obtain a plurality of second parameters, each associated with one of the plurality of APs; at 1904, generating feedback based on the first parameter, the plurality of second parameters and a number of the plurality of APs; and at 1905, transmitting the feedback to at least one of the plurality of APs.

Accordingly, the WTRU according to this application may comprises: a transceiver, configured to receive a plurality of repetition beacons, one from each of a plurality of APs, each of the plurality of repetition beacons comprising a common information part and an AP-specific information part; and a processor, configured to decode at least one of the plurality of common information parts or a combination of one or more common information parts to obtain a first parameter; decode the plurality of AP-specific information parts to obtain a plurality of second parameters, each associated with one of the plurality of APs; and generate feedback based on the first parameter, the plurality of second parameters and a number of the plurality of APs, wherein the transceiver is further configured to transmit the feedback to at least one of the plurality of APs.

The following description will describe the above-mentioned processes from 1901 to 1905 and the components of the WTRU in detail. Some embodiments may also direct to the example shown in FIG. 18 for reference.

The process at 1901 will be discussed as follows. As shown in FIG. 19, the method 1900 may comprise, at 1901, receiving a plurality of repetition beacons, one from each of a plurality of APs, each of the plurality of repetition beacons comprising a common information part and an AP-specific information part. Accordingly, the transceiver may be configured to receive a plurality of repetition beacons, one from each of a plurality of APs, each of the plurality of repetition beacons comprising a common information part and an AP-specific information part.

The repetition beacon may also be referred to as multi-AP repetition beacon or multi-AP repetition beacon frame. As discussed above with reference to FIG. 10-14, the multi-AP repetition beacon may be transmitted from a group of APs. In some embodiments, the multiple APs or the AP group may form a virtual AP, and the APs may share a common virtual BSSID (vBSSI) and/or virtual SSID (vSSID) and/or virtual BSS color when they transmit the multi-AP repetition beacon frames. In some embodiments, the multiple APs may form a group, and a master AP may control the group or a central controller may control the group. The group of APs may transmit Multi-AP repetition beacon with using a common BSSID assigned by the master AP or a Multi-AP central controller.

The multi-AP repetition beacons may be transmitted in different ways shown in FIGS. 10-14. For example, the multi-AP repetition beacons may be transmitted in different time slot sequentially as shown in FIG. 10. The multi-AP repetition beacons may be transmitted concurrently as shown in FIG. 11. In an embodiment shown in FIG. 12, a leading AP may start the multi-AP repetition beacon transmission first, and the rest of APs in the group may transmit the multi-AP repetition beacon concurrently xIFS duration after reception of the leading AP transmission. In an embodiment shown in FIG. 13, a leading AP may transmit a multi-AP beacon trigger frame, and then all APs in the group may transmit multi-AP repetition beacon concurrently xIFS duration right after the trigger frame.

The multi-AP repetition beacons transmitted from the group of APs may have the common information part comprising MAC body and modulation and coding schemes so that a STA may combine the received signal. A special indicator may be needed to indicate the repetition transmission so the receiver may combine them. For example, in PLOP header, or MAC header or beacon frame, a special indicator, such as a multi-AP repetition transmission field, may be set so that a receiving STA may combine them.

In some embodiments, the common information part may comprise identical information among the group of APs. For example, the common beacon may carry information discussed above, such as Virtual BSSID, SSID, multi-AP beacon schedule, preferred Scanning methods, members of the same multi-AP group, and other information normally carried in Beacon frame. The information carried by the common beacon can be understood with reference to the above paragraphs regarding the multi-AP scanning scheme. It should be noted the above-mentioned information in the common information part is only given by way of example, and they are not intended to be exclusive or be limiting to the present application. The common information part may comprise any available information based on the above described principle of this application as long as that information may be helpful to realize such principle.

The AP-specific information part may comprise one or more of the following fields: a field for AP ID, a field for a total number of repetition beacons, a field for a repetition transmission ID, a decoding parameter (e.g., a decoding metric) and/or a field for a number of remaining repetition beacons to be transmitted. The AP ID field may be used to uniquely identify an AP in the AP group/virtual AP. The total number of repetition beacons field may be used to indicate the number of the total number of repetition beacons. Alternatively, this may be carried in the common beacon part. The Repetition transmission ID field may be set to k to indicate the current transmission may be the kth repetition transmission among the beacon set. It should be noted that the above-mentioned fields in the specific information part is only given by way of example, and they are not intended to be exclusive or be limiting to the present application. The AP-specific information part may comprise any available information/field based on the above described principle of this application as long as that information/field may be helpful to realize such principle.

The common information part and the AP-specific information part may be realized and transmitted using multiple different ways. The following description will discuss some preferred ways for realizing and transmitting the common information part and the AP-specific information part.

In some embodiments, the repetition beacon (i.e., the multi-AP repetition beacon) may be aggregated with the normal 802.11 beacon, e.g., with each beacon being sent in a coordinated manner at a TBTT for each AP. In that case, the common information part and the AP-specific information part may be aggregated with the normal beacon.

In some embodiments, the repetition beacon may be sent as a separate beacon with common and AP-specific components, i.e., the common information part and the AP-specific information part. Preferably, the common information part and the AP-specific information part may be transmitted in the ways shown in FIGS. 10-25). The following description will further discuss those ways with reference to FIGS. 10-25.

Preferably, in each repetition beacon, the common information part and the AP-specific information part may be aggregated together with no interframe spacing between them. This preferable embodiment may be implemented through the following four different scenarios shown by four elements in FIG. 20.

Figure 20:
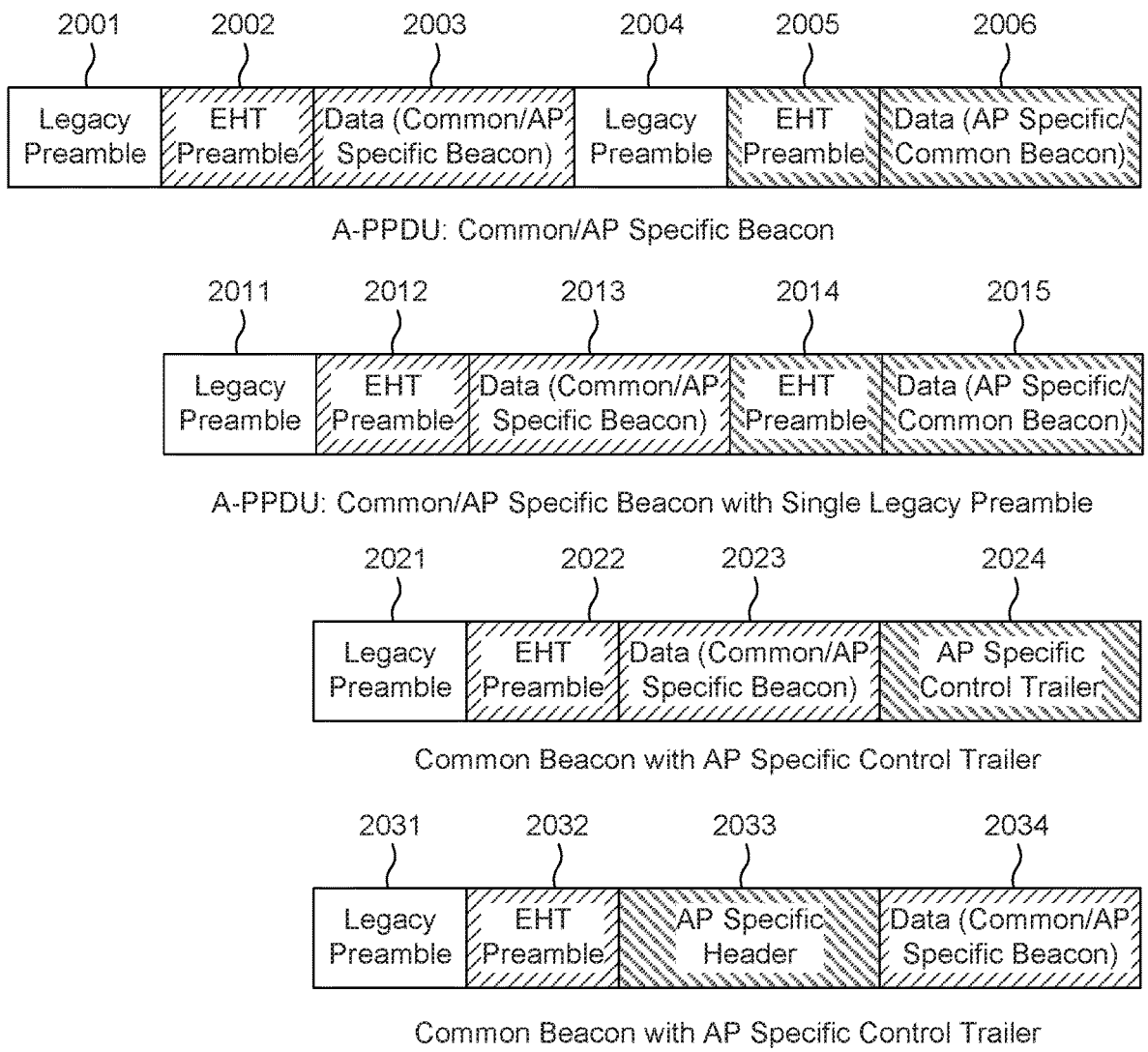
FIG. 20 illustrates an example aggregated beacon structure.

In the first scenario, the common information part and the AP-specific information part may be transmitted with separate preambles as an aggregated PPDU (A-PPDU). As shown in the first element of FIG. 20, a common information part 2003 may be transmitted with a legacy preamble 2001 and an EHT preamble 2002; an AP-specific information part 2006 may be transmitted with a legacy preamble 2004 and an EHT preamble 2005. There is no interframe spacing between the common information part 2003 and the AP-specific information part 2006. The sequence of the common information part and the AP-specific information part shown by the first element is only exemplary. For example, in an embodiment, the item 2003 may represent an AP-specific information part and meanwhile the item 2006 may represent a common information part. It should be noted that the first element of FIG. 20 is only given by way of example, and it is not intended to be exclusive or be limiting to the present application. For example, the common information part and the AP-specific information part may be transmitted with HE/EHT or a later version preamble.

In the second scenario, they may be transmitted with a single legacy preamble but with separate EHT preambles. As shown in the second element of FIG. 20, a common information part 2013 may be transmitted with an EHT preamble 2012; an AP-specific information part 2015 may be transmitted with an EHT preamble 2014; the common information part 2013 and the AP-specific information part may be transmitted with a legacy preamble 2011. There is no interframe spacing between the common information part 2013 and the AP-specific information part 2015. The sequence of the common information part and the AP-specific information part shown by the second element is only exemplary. For example, in an embodiment, the item 2013 may represent an AP-specific information part and meanwhile the item 2015 may represent a common information part. It should be noted that the second element of FIG. 20 is only given by way of example, and it is not intended to be exclusive or be limiting to the present application. For example, the common information part and the AP-specific information part may be transmitted with HE/EHT or a later version preamble.

In the third scenario, the AP-specific information may be transmitted as a control trailer to the common AP. As shown in the third element of FIG. 20, the AP-specific information part may be carried in a control trailer 2024. A common information part 2023 and the AP-specific information part 2024 may be transmitted with a legacy preamble 2021 and an EHT preamble 2022. There is no interframe spacing between the common information part 2023 and the AP-specific control trailer 2024. The sequence of the common information part and the AP-specific information part shown by the third element is only exemplary. For example, in an embodiment, the item 2023 may represent an AP-specific information part and meanwhile the item 2024 may represent a control trailer which carries a common information part. It should be noted that the third element of FIG. 20 is only given by way of example, and it is not intended to be exclusive or be limiting to the present application. For example, the common information part and the AP-specific information part may be transmitted with HE/EHT or a later version preamble.

In the fourth scenario, the AP-specific information part may be placed in a specific area in the PLOP header. As shown in the fourth element of FIG. 20, the AP-specific information part may be an AP-specific header 2033. In that case, a common information part 2034 and the AP-specific header may be transmitted with a legacy preamble 2031 and an EHT preamble 2032. The sequence of the common information part and the AP-specific information part shown by the fourth element is only exemplary. For example, in an embodiment, the item 2033 may represent a common header as a common information part and meanwhile the item 2034 may represent an AP-specific information part.

The above description discussed a separation between the common information part and the AP-specific information part. It should be noted that such separation may be necessary to enable the STA to perform, on the common preamble, repetition, combining, etc. It should be also noted that the preamble for the AP-specific part may have different transmission parameters (e.g. MCS) from the preamble for the common information part. For example, the AP-specific information part may be coded and modulated with lower data rate so that a STA may be able to decode this part without repetition combination as did for the common information part.

Figure 21:
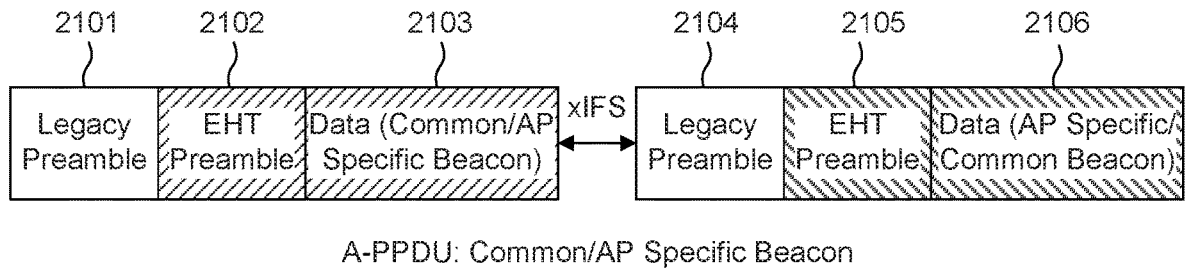
FIG. 21 illustrates an example separated beacon structure.

Preferably, the common information part and the AP-specific information part may be transmitted together with an xIFS between them. In such cases, the common information part and the AP-specific information part have to have separate preambles. FIG. 21 illustrates an exemplary separated structure for this preferably embodiment. As shown in FIG. 21, a common information part 2103 may be transmitted with a legacy preamble 2101 and an EHT preamble; an AP-specific information part 2106 may be transmitted with a legacy preamble 2104 and an EHT preamble 2105; there is an xIFS spacing between the common information part 2103 and the legacy preamble 2104. The sequence of the common information part and the AP-specific information part shown in FIG. 21 is only exemplary. For example, in an embodiment, the item 2103 may represent an AP-specific information part and meanwhile the item 2106 may represent a common information part. For example, the common information part and the AP-specific information part may be transmitted with HE/EHT or a later version preamble.

Preferably, the common information part and the AP-specific part may be transmitted separately as two different beacons. That is, the common information part may be transmitted as a common beacon, and the AP-specific part may be transmitted as an AP-specific beacon. In that case, each AP may transmit a common beacon and an AP-specific beacon, and the common beacon and the AP-specific beacon together may form a repetition beacon.

In some embodiments, the common beacon and the AP-specific beacon may be transmitted separately with different TBTTs.

In some embodiments, the common beacons are grouped together and the AP specific beacons are grouped together. The STA may implicitly identify the AP that sends a common beacon based on its transmission time relative to the transmission of the AP-specific beacon. Some such embodiments allow the use of the normal beacon as the AP specific beacon. The order of the beacons may be signaled in the common beacon and the order may be static, semi-static or dynamic.

Figure 22:
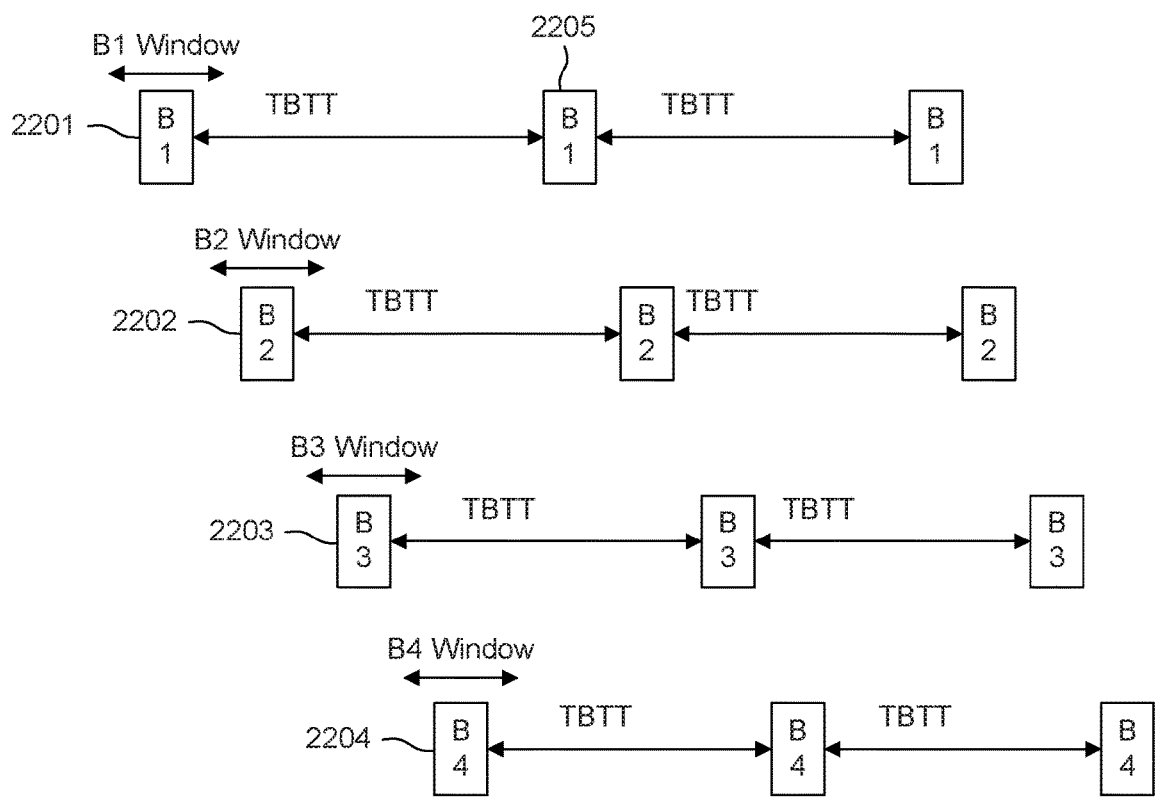
FIG. 22 illustrates an example allowable transmission window to prevent AP specific beacon overlap.
Figure 23:
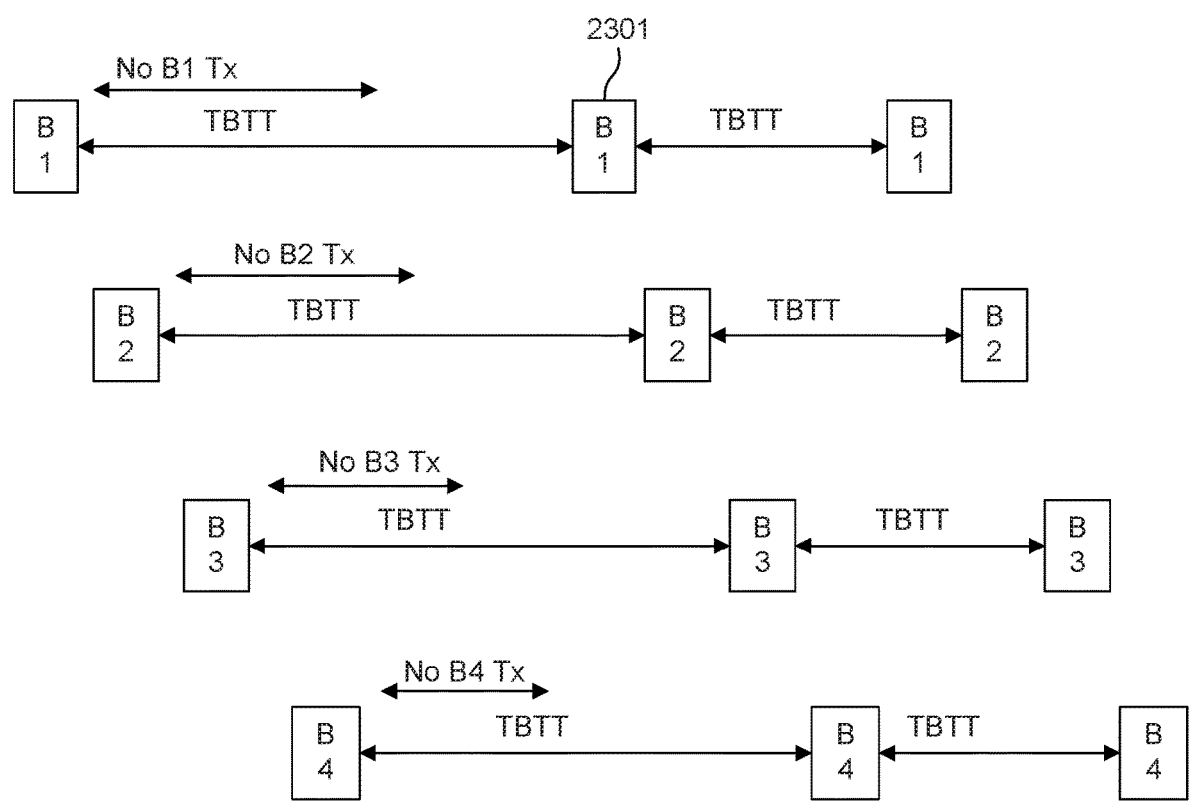
FIG. 23 illustrates an example non-allowed transmission window to prevent AP specific beacon overlap.

In some embodiments, it may be necessary to coordinate the transmissions of the repetition beacons, as the APs may be located in a manner that enhanced distributed channel access (EDCA) does not prevent them from transmitting at the same time while the STA needs them to transmit at separate times to be able to decode the AP-specific parts of the repetition beacons. To ensure that the AP-specific parts of the repetition beacons do not overlap, a transmission window may be defined and an AP is allowed to transmit according to its window (e.g., either transmitting within its window only, or not transmitting within its window). Thus, by not letting multiple windows overlap with each other, the APs may coordinate to ensure that their repetition beacons do not overlap. Therefore, both the common parts and the AP-specific parts from the repetition beacons may be decoded successfully. FIGS. 22-23 show two examples of the above-mentioned windows. The following description will describe the windows with reference to each example in more detail.

FIG. 22 illustrates an example of the above-mentioned windows. In this example, each AP is allowed to transmit a repetition beacon within a window assigned to it only. As shown in FIG. 22, B1 represents a repetition beacon transmitted by AP1, and AP1 may only transmit its repetition beacon within a B1 window 2201. B2 represents a repetition beacon transmitted by AP2, and AP2 may only transmit its repetition beacon within a B2 window 2202. B3 represents a repetition beacon transmitted by AP3, and AP3 may only transmit its repetition beacon within a B3 window 2203. B4 represents a repetition beacon transmitted by AP4, and AP4 may only transmit its repetition beacon within a B4 window 2204.

As shown in FIG. 22, the B1 window 2201, the B2 window 2202, the B3 window 2203 and the B4 window 2204 may not overlap with each other. In one embodiment, there may be no time gap between two adjacent windows. In other words, the windows assigned to different APs may connect to each other end to end. For example, as shown in FIG. 22, there is no time gap between the B1 window 2201 and the B2 window 2202. The rest windows may be designed in a similar fashion. As shown in FIG. 22, AP1 may only transmit a second repetition beacon (represented by 2205) after the B4 window 2204. That is, the time duration (e.g., TBTT) between two successive windows assigned for AP1 may be greater than the length of the windows assigned for AP2, AP3 and AP4.

In another embodiment, there may be a time gap between two adjacent windows. For example, there may be a time duration (not shown in FIG. 22) between B1 window for AP1 and B2 window for AP2. The rest windows may be designed in a similar fashion. In that case, AP1 may only transmit a second repetition beacon after the B4 window. That is, the time duration (e.g., TBTT) between two successive windows assigned for AP1 may be greater than the length of the windows assigned for the rest AP in the group plus the time gaps between each two adjacent windows.

It will be appreciated that the above embodiments described and the example shown in FIG. 22 are only given by way of example, and they are not intended to be exclusive or be limiting to the present application. For example, there may be more than (or less than) 4 APs in the group, and windows for those APs may be designed in a similar way as discussed above as long as those repetition beacons may be transmitted separately without overlapping with each other.

FIG. 23 illustrates another example of the above-mentioned windows. In this example, each AP is allowed to transmit a repetition beacon within a window assigned to it only. As shown in FIG. 23, B1 represents a repetition beacon transmitted by AP1, and "No B1 Tx" represents a window assigned for AP1. AP1 may not be allowed to transmit its repetition beacon within "No B1 Tx". B2 represents a repetition beacon transmitted by AP2, and "No B2 Tx" represents a window assigned for AP2. AP2 may not be allowed to transmit its repetition beacon within "No B2 Tx". B3 represents a repetition beacon transmitted by AP3, and "No B3 Tx" represents a window assigned for AP3. AP3 may not be allowed to transmit its repetition beacon within "No B3 Tx". B4 represents a repetition beacon transmitted by AP4, and "No B4 Tx" represents a window assigned for AP4. AP4 may not be allowed to transmit its repetition beacon within "No B4 Tx".

As shown in FIG. 23, the repetition beacons (e.g., B1, B2, B3, and B4) may be transmitted separately without overlapping with each other. Meanwhile, the duration of the window "No B1 Tx" may be long enough to let the rest APs (e.g., AP2, AP3 and AP4) complete their repetition beacon transmission. Further, the duration of the window "No B2 Tx" may be long enough to let the rest APs (e.g., AP3 and AP4) complete their repetition beacon transmission. Moreover, the duration of the window "No B3 Tx" may be long enough to let the rest APs (e.g., AP4) complete their repetition beacon transmission.

As shown in FIG. 23, the windows may share the same length. For example, the window "No B1 Tx" may have the same length as that of the window "No B2 Tx". As shown in FIG. 23, AP1 may only transmit a second repetition beacon (represented by 2301) after the window "No B4 Tx". That is, the time duration (e.g., TBTT) between two successive repetition beacon transmissions may be greater than the duration from the starting point of the window "No B2 Tx" to the end point of the window "No B4 Tx".

It will be appreciated that the above embodiments described and the example shown in FIG. 23 are only given by way of example, and they are not intended to be exclusive or be limiting to the present application. For example, there may be more than (or less than) 4 APs in the group, and windows for those APs may be designed in a similar way as discussed above as long as those repetition beacons may be transmitted separately without overlapping with each other. For another example, the windows shown in FIG. 23 may not share the same length. In that case, AP1 may only transmit a second repetition beacon after the end point of the window "No B4 Tx".

The process at 1902 will be discussed as follows. As shown in FIG. 19, at 1902, the method 1900 may comprise decoding at least one of the plurality of common information parts or a combination of one or more common information parts to obtain a first parameter. Accordingly, the processor is configured to decode at least one of the plurality of common information parts or a combination of one or more common information parts to obtain a first parameter.

As discussed above, the common information parts may comprise identical information among the group of APs. Therefore, decoding a subset of the common information parts may obtain necessary information needed for the other processes following the process at 1902. In an embodiment, decoding only one common information part from all of the received common information parts may be good enough. For example, if the transceiver received four common information parts from our APs respectively and the four common information parts are identical, then the processor may only one common information part (anyone of the four common information parts) to obtain the first parameter. In another embodiment, one or more of the received common information parts may be buffered, combined and decoded in order to obtain the first parameter. For example, if the transceiver received a first common information part from AP1, a second common information part from AP2, and a third common information part from AP3, then the processor may decode a combination of the first common information part and the second common information part to obtain the first parameter. The processor may also decode a combination of all above-mentioned three common information parts to obtain the first parameter. The way to decode a combination of multiple common information parts will be further described below with reference to a process to obtain a total number of the APs in the group.

Preferably, the process at 1902 may further comprise: buffering the plurality of common information parts; combining the plurality of common information parts; and decoding the combined common information parts. Accordingly, for decoding at least one common information part to obtain a first parameter, the processor may be configured to buffer the plurality of common information parts, combine the plurality of common information parts, and decode the combination of common information parts.

The first parameter may indicate that the max number of APs which may be selected to do multi-AP transmission. Generally, the method 1900 may return a feedback indicating desired AP combination(s) for multi-AP transmission to the AP group, and then the AP group may use this feedback to select an AP or multiple APs for multi-AP transmission. Therefore, the max number of APs which will be selected to do multi-AP transmission may also represent how many APs at most a desired AP combination may have. In other words, the first parameter may represent how many APs at most the STA may select to calculate in order to obtain desired AP combination(s). For example, the first parameter may indicate that the max number of APs which may be selected for multi-AP transmission is M. In other words, there may be at most M APs in a desired AP combination. Preferably, M is 2. That is, in a preferred embodiment, the first parameter may indicate that at most two AP in the group may be selected for multi-AP transmission. The first parameter should be no more than the total number of APs in the group. The following description will further describe this first parameter with reference to detail embodiments below. It should be noted that in this application, unless otherwise indicated, the terms "an AP combination" and "a combination of AP(s)" may be used interchangeably.

The first parameter may indicate a preferred multi-AP scheme to be used to enable the STA to do calculation at a later process, e.g., the process at 1904. The preferred multi-AP scheme may indicate a way of estimate a decoding metric (e.g., a second parameter described later). It should be noted that the decoding metric may also be independent of the multi-AP scheme, and the manner of selecting APs by the AP group may be implementation dependent. It should also be noted that the first parameter may not be the only parameter obtained from the common information parts. Other parameters may also be obtained from the common information parts as long as they may help to realize the principle of this application. For example, a fourth parameter (described below) may be obtained from a combination of one or more common information parts.

The process at 1903 will be discussed as follows. As shown in FIG. 19, at 1903, the method 1900 may comprise decoding the plurality of AP-specific information parts to obtain a plurality of second parameters, each associated with one of the plurality of APs. Accordingly, the processor may be configured to decode the plurality of AP-specific information parts to obtain a plurality of second parameters, each associated with one of the plurality of APs.

The STA may identify the specific APs by decoding the AP specific information. The second parameter may be a decoding metric which may be used to represent an AP's capability to support multi-AP transmission with the STA. Preferably, the second parameter may include any one of the following parameters: Signal to Noise Ratio (SNR), Signal to Interference and Noise Ratio (SINR), Reference Signal Received Power (RSRP), and Reference Signal Received Quality (RSRQ). The above-mentioned exemplary second parameter may be considered as an indicator for network quality. Therefore, the STA may do calculation based on network quality, thereby providing a result of desired AP combination(s).

Although the above description already describes some examples of the second parameter, they are not intended to be exclusive or be limiting to the present application. The second parameter may also be any other decoding metrics or parameters as long as they may help to realize the principle of this application. The following description will further describe the second parameter with reference to detailed embodiments.

The process at 1904 will be discussed as follows. As shown in FIG. 19, at 1904, the method 1900 may comprise generating feedback based on the first parameter and the plurality of second parameters and the total number of the plurality of APs. Accordingly, the processor may be configured to generate feedback based on the first parameter, the plurality of second parameters and a number of the plurality of APs.

The STA may obtain the total number of the APs in the group by decoding the common information parts from the APs. For example, as shown in FIG. 18, the STA (or the transceiver) may receive one packet or transmission (e.g., the common information part from AP1) and then the STA may try to decode the packet or transmission. If the STA fails to decode the packet or transmission, and the STA may know that more repetition transmissions may follow, the STA may buffer the received packet or transmission (e.g., log likelyhood ratios (LLRs) or received demodulated complex numbers). Then, the receiver may continue receiving the following repetition transmissions, e.g., the common information part from AP2. Once the receiver receive a signal which may be a repetition transmission for the bufferred one, the STA may combine the received signal (e.g., the common information part from AP2) with bufferred signal (e.g., the common information part from AP1) and then decode. If the STA fails to decode the combined signal, and STA may know that more repetition transmissions are expected, the STA may buffer the updated signal (e.g., the combination of common information part from AP1 and AP2). And then, in a similar way, the STA may receive, buffer and combine more signals (e.g., the common information parts from AP3 and AP4) until the STA successfully decodes a combined signals. In this way, the STA may know parameters (e.g., the above-mentioned first parameter) obtained from decoding the common information part(s). Also in this way, the processor may know the total number of the APs in the group. For example, if the processor buffered, combined and decoded four common information parts, then the processor may know the total number of APs in the group is 4. In one embodiment, the number of total repetitions may be in PHY layer signaling and decoded before decoding common information part. In another embodiment, the processor may obtain the number of the APs in the group by decoding the received AP-specific information parts. For example, if the processor decoded 4 AP-specific information parts, the processor will know that the total number of APs in the group is 4.

It should be appreciated that the above-mentioned embodiments and examples of the number of APs are only given by way of example, and they are not intended to be exclusive or be limiting to the present application. The number of APs in a group may be obtained through any other available methods as long as they may help to realize the principle of this application.

Preferably, the process at 1904 may comprise the following two sub-processes: performing a calculation based on the first parameter, the plurality of second parameters and the number of the plurality of APs to obtain a calculation result; and generating the feedback based on the calculation result.

The processor may perform the calculation based on the first parameter, the obtained second parameters (i.e., decoding metrics) and the number of APs. After the calculation, one or more AP combinations may be obtained. Based on the above-mentioned first parameter, a desired AP combination may comprise M APs at most. Therefore, in each obtained AP combination, there may be only one AP or multiple APs (i.e., less than or equal to M APs). The calculation may be mainly performed on the decoding metrics, thereby obtaining new decoding metrics. In this application, those new decoding metrics obtained from the calculation may be referred to as third parameters. Preferably, the calculation result may comprise one or multiple AP combinations. Preferably, the calculation result may further comprise a third parameter for each of the plurality of AP combinations. The following description will further describe AP combinations as well as their third parameters with reference to detailed embodiments. In this method, the calculation mentioned above may be performed on the STA side and the STA may feedback suggested AP combination(s) to the APs.

In an embodiment, the processor may perform calculation by averaging the value of the second parameters of APs in each AP combination. In this embodiment, the calculation may be performed based on the following equation (1)

$$Z = \frac{x_1 + x_2 + \ldots + x_n}{n} \qquad \text{Equation 1}$$

In the equation (1), $x_n$ represents a second parameter value of an AP; n represents the number of APs in an AP combination; Z represents an average value of the APs' second parameter values in the AP combination.

In another embodiment, the processor may perform calculation by calculating a difference between an average value of APs' second parameter values in an AP combination and an overall average value of all APs' second parameter values in the group. In this embodiment, the calculation may be performed based on the following equation (2)

$$Z = \frac{x_1 + x_2 + \ldots + x_n}{n} - \frac{x_1 + x_2 + \ldots + x_m}{m} \qquad \text{Equation 2}$$

In the equation (2), $x_n$ and $x_m$ represent a second parameter value of an AP; n represents the number of APs in an AP combination; and m represents the total number of APs in the group.

The following description will describe the calculation performed by the STA in detail with reference to three examples.

In a first example, there are following assumptions: the first parameter (M) is 2 indicating at most two APs in a desired AP combination; the total number of APs is 4; the second parameter is SINR value of each AP; the SINR value of AP1 is 6, the SINR value of AP2 is 12; the SINR value of AP3 is 18; and the SINR value of AP4 is 24. It should be noted that since there are at most two APs in a desired AP combination, a desired combination may comprise only one AP or at most two AP. All potential qualified AP combination should count. Based on the first parameter and the number of APs, there are 4 ways to select a single AP from the four APs, and 6 ways to select two APs from the four APs (i.e., $C_4^2 = (4 \times 3)/(2 \times 1)$), i.e., a total of 10 different AP combinations: (1) AP1; (2) AP2; (3) AP3; (4) AP4; (5) AP1+AP2; (6) AP1+AP3; (7) AP1+AP4; (8) AP2+AP3; (9) AP2+AP4; and (10) AP3+AP4. For an AP combination comprising two APs, the STA may obtain a SINR value for the AP combination by averaging two SINR values of the two APs in the AP combination based on the above equation (1). For example, the SINR value for the AP combination comprising AP2 and AP3 is 15. Therefore, after the calculation discussed above, the STA may obtain the following Table 1. As shown in Table 1, those obtained SINR values shown in the second line are third parameters for obtained AP combinations shown in the first line.

TABLE 1

| AP combination | AP1 | AP2 | AP3 | AP4 | AP1 + AP2 | AP1 + AP3 | AP1 + AP4 | AP2 + AP3 | AP2 + AP4 | AP3 + AP4 |
| --- | --- | --- | --- | --- | --- | --- | --- | --- | --- | --- |
| SINR value (dB) | 6 | 12 | 18 | 24 | 9 | 12 | 15 | 15 | 18 | 21 |

As shown in Table 1, the calculation result comprises multiple AP combination shown in the first line and multiple SINR values (i.e., third parameters) each of which corresponds to an AP combination.

In a second example, there are the same assumptions as those in the above first example. That is, the first parameter is 2, indicating there are at most two APs in a desired AP combination; the number of APs is 4; the second parameter is SINR value of each AP; the SINR value of AP1 is 6, the SINR value of AP2 is 12; the SINR value of AP3 is 18; and the SINR value of AP4 is 24. The difference between the second example and the first example is the way to perform calculation. In the second example, the STA may perform the calculation based on the above equation (2). After the calculation, the STA may obtain the following AP combinations with SINR values shown in Table 2.

TABLE 2

| AP combination | AP1 | AP2 | AP3 | AP4 | AP1 + AP2 | AP1 + AP3 | AP1 + AP4 | AP2 + AP3 | AP2 + AP4 | AP3 + AP4 |
| --- | --- | --- | --- | --- | --- | --- | --- | --- | --- | --- |
| SINR value difference (dB) | −9 | −3 | 3 | 9 | −6 | −3 | 0 | 0 | 3 | 6 |

In a third example, there are following assumptions: the first parameter is 3, indicating that there are at most three APs in a desired AP combination; and the other assumptions are the same as those in the above first example. The STA may perform the calculation based on the above equation (1). After the calculation, the STA may obtain the following AP combinations with SINR values shown in Table 3.

TABLE 3

| AP combination | AP1 | AP2 | AP3 | AP4 | AP1 + AP2 | AP1 + AP3 | AP1 + AP4 | AP2 + AP3 | AP2 + AP4 | AP3 + AP4 |
|---|---|---|---|---|---|---|---|---|---|---|
| SINR value (dB) | 6 | 12 | 18 | 24 | 9 | 12 | 15 | 15 | 18 | 21 |
| AP combination | AP1 + AP2 + AP3 | | | | AP1 + AP2 + AP4 | | | AP1 + AP3 + AP4 | | AP2 + AP3 + AP4 |
| SINR value (dB) | 12 | | | | 14 | | | 16 | | 18 |

It should be noted that although the above description described some examples of the calculation as well as two equations which may be used for the calculation, they are not intended to be exclusive or be limiting to the present application. The calculation may be performed based on any other available equations as long as those equations may help to realize the principle of this application. For example, the STA may perform the calculation based on variance equation, standard variance equation, etc. It should also be noted that the above examples as well as those parameter values are given by way of example, and they are not intended to be limiting to the present application.

The following embodiments will describe how to generate the feedback based on the calculation result.

In an embodiment, the feedback may comprise at least one of the multiple AP combinations based on the calculation result obtained from the process at 1904. In other words, the STA may not transmit all of the calculation result including all AP combinations obtain from the calculation, but only a part of the AP combinations.

For example, when decoding the common information parts, the processor may obtain a fourth parameter (K) indicating that the STA may feedback the best K AP combinations to the AP group. In the above first example with Table 1, if K=6, then the feedback may comprise the following AP combinations: AP4 (SINR value=24); AP3+AP4 (SINR value=21); AP2+AP4 (SINR value=18); AP3 (SINR value=18); AP2+AP3 (SINR value=15); and AP1+AP4 (SINR value=15). In this example, the AP(s) received the feedback may select a specific AP combination from the above-mentioned 6 AP combinations for multi-AP transmission. It should be noted that the above example of K is only given by way of example, and it is not intended to be limiting to the present application. In an embodiment, the fourth parameter may be obtained by decoding the common information part(s). The method for obtaining the fourth parameter may be similar to that for obtaining the first parameter described above. For example, if the transceiver received a first common information part from AP1, a second common information part from AP2, and a third common information part from AP3, then the processor may decode a combination of the first common information part and the second common information part to obtain the fourth parameter. The processor may also decode a combination of all above-mentioned three common information parts to obtain the fourth parameter.

In an embodiment, the feedback may comprise the calculation result obtained from the process at 1904. That is, at the process 1905, the STA may transmit all of the calculation result obtained to the APs in the group. As discussed above, the calculation result may comprise one or multiple AP combinations as well as a new decoding metric (i.e., a third parameter) for each AP combination. In this embodiment, the APs in the group received the feedback may select a specific AP combination from all of the multiple AP combinations obtained from the calculation (e.g., AP combinations shown in Table 1) for multi-AP transmission.

Preferably, the feedback may comprise both at least one of the multiple AP combinations obtained from the calculation and a third parameter associated with each of the at least one of the multiple AP combinations. In the above first example with Table 1, the feedback may be shown as the following Table 4 (assuming K=6):

TABLE 4

| AP combination | AP3 | AP4 | AP1 + AP4 | AP2 + AP3 | AP2 + AP4 | AP3 + AP4 |
|---|---|---|---|---|---|---|
| SINR value (dB) | 18 | 24 | 15 | 15 | 18 | 21 |

The purpose of transmitting the obtained SINR values (i.e., third parameters) to the AP(s) in the group is to let the AP group know the third parameter for each obtain AP combination. Then, the AP group may select a desired AP combination based on the third parameter for multi-AP transmission.

In an embodiment, the feedback may comprise an AP bitmap based on the calculation result. The bitmap may be considered as a punctured AP bitmap. In the punctured AP bitmap, the AP(s) not selected in an AP combination will not be shown or such AP(s) will be indicated to be unavailable. In that case, such AP(s) may be considered to be punctured from the bitmap. The bitmap size may be the same as the number of APs in the group, or number of beacons in the repetition beacon transmission. In the above third example with Table 3, if the STA wants to transmit a feedback including the AP combination AP2+AP3+AP4, the AP bitmap may be shown in the following Table 5:

TABLE 5

| 0 | 1 | 1 | 1 |
|---|---|---|---|

As shown in Table 5, each number represents an AP, and there are four APs (AP1-AP4 from the left end to the right end); "0" represents that AP1 is not in this AP combination. "1" represents that AP2-AP4 are in this AP combination. It should be appreciated that the bitmap included in the feedback may vary based on the AP(s) in the AP combinations, and the above example of bitmap shown in Table 5 is only given by way of example, and it's not intended to be limiting to the present application.

In an embodiment, the feedback may comprise multiple fields and each of the multiple fields may comprise a third parameter and an AP identifier identifying an AP combination. In other words, the STA may transmit a feedback comprising multiple fields each of which may combine an AP (or set of APs) identifier and the corresponding third parameter (e.g., calculated SINR value). In the above first example with Table 1, a 4 bit-field AP identifier may be defined such that each bit may correspond to a specific AP in the group. For example, "1010" may indicate AP1 and AP3 are selected in this AP combination. The feedback transmitted by the STA in the above first example with Table 1 may be shown as the following Table 6 (assuming K=6).

TABLE 6

| Identifier | 0010 | 0001 | 1001 | 0110 | 0101 | 0011 |
|---|---|---|---|---|---|---|
| SINR value (dB) | 18 | 24 | 15 | 15 | 18 | 21 |

As shown in Table 6, a field consists of a pair of AP identifier and SINR value. There are 6 fields in total each of which represents an AP combination obtained from the calculation. It should be noted that the above Table 6 as well as its 4 bit-field AP identifier indicating AP(s) in each AP combination is only given by way of example, and it's not intended to be limiting to the present application. Any other available identifier may be used to indicate AP combination (s) as long as they may help to realize the above-mentioned principle of this application.

Preferably, the feedback may be ordered in multiple ways. That is, the AP combination(s) in the calculation result may be ordered in multiple ways. For example, the AP combinations may be in a descending order based on SINR value. In the above first example shown with Table 1, the feedback transmitted by the STA may be shown as the following Table 7 (assuming K=6).

TABLE 7

| AP combination | AP4 | AP3 | AP2 + AP4 | AP1 + AP4 | AP2 + AP3 | AP3 + AP4 |
|---|---|---|---|---|---|---|
| SINR value (dB) | 24 | 18 | 18 | 15 | 15 | 21 |

As shown in Table 7, these 6 AP combinations are listed in a descending order based on their SINR values. The order of the AP combinations may implicitly identify the APs selected by the AP group. That is, the AP group may select AP(s) based on the order of the AP combinations transmitted in the feedback.

It should be noted that the above Table 7 as well as the exemplary descending order is only given by way of example, and it's not intended to be exclusive or be limiting to the present application. The AP combinations in the feedback may be listed in an ascending order based on SINR values. In another embodiment, the AP combination in the feedback may be listed based on the number of AP in each AP combination. For example, those AP combinations comprising two APs may be listed before those AP combinations comprising only one AP. It should be noted that the order of AP combinations may be not limited to the bit-map order as discussed above.

In an embodiment, the calculation result may indicate an AP combination is not valid if the AP combination is unqualified. For example, in the above second example shown with Table 2, those AP combinations whose SINR value is lower than "0" may be considered to be unqualified, and thus, the AP combinations whose SINR value is lower than "0" may be indicated as "not valid". In that case, in the above second example, the STA may obtain the following AP combinations with SINR values shown in Table 8.

TABLE 8

| AP combination | AP1 | AP2 | AP3 | AP4 | AP1 + AP2 | AP1 + AP3 | AP1 + AP4 | AP2 + AP3 | AP2 + AP4 | AP3 + AP4 |
|---|---|---|---|---|---|---|---|---|---|---|
| SINR value difference (dB) | not valid | not valid | 3 | 9 | not valid | not valid | 0 | 0 | 3 | 6 |

The process at 1905 will be discussed as follows. As shown in FIG. 19, at 1905, the method may comprise transmitting the feedback to at least one of the plurality of APs. The AP(s) received the feedback may select an AP or a plurality of APs from the group for multi-AP transmission.

Figure 24:
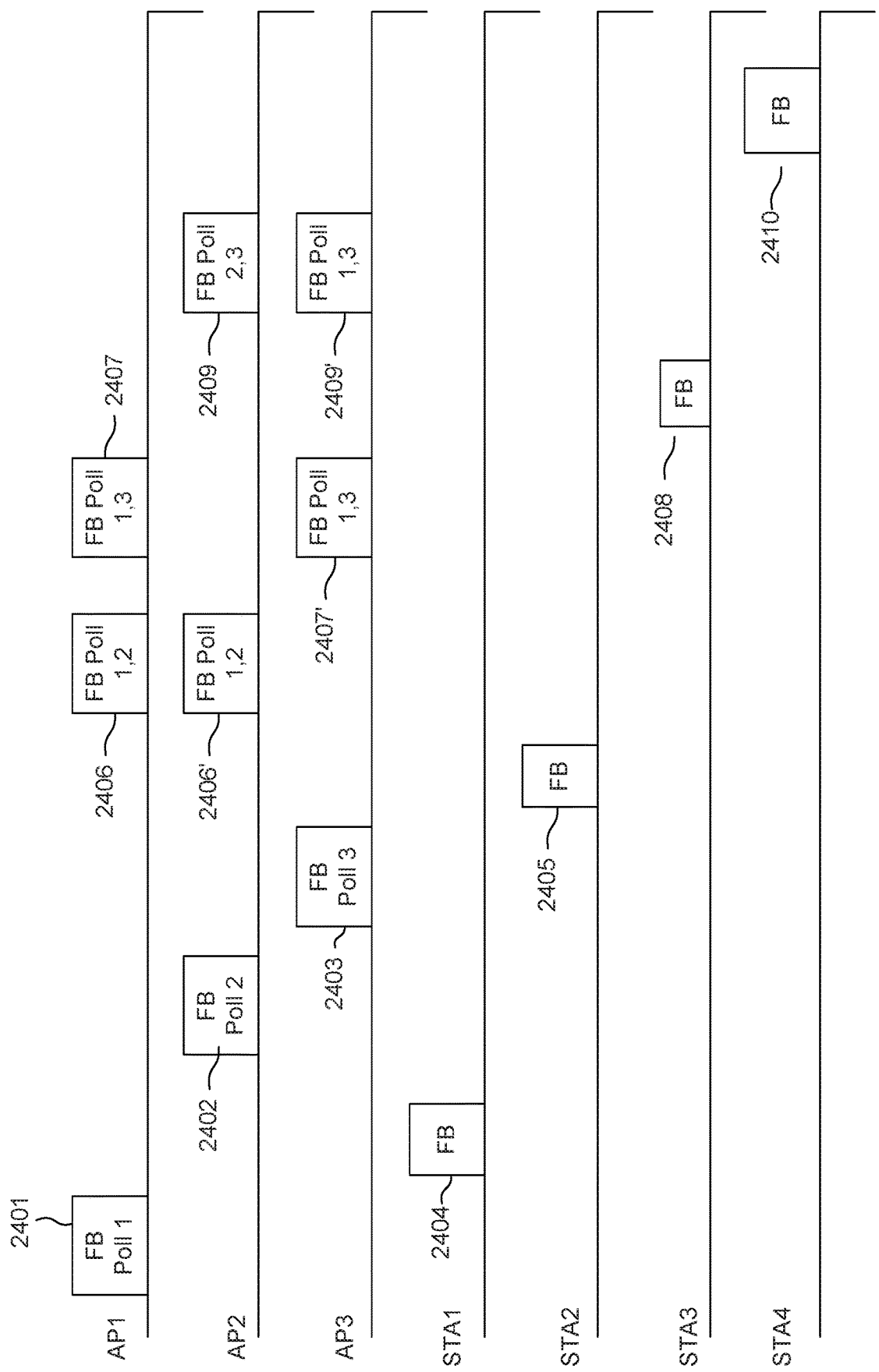
FIG. 24 illustrates example single/multi-AP feedback polling/triggering.

In some embodiments, the STA may be able to connect to a single AP. In some such embodiments, the STA may be polled by the primary AP (i.e., the AP that the STA is associated with). The STA may be triggered by the primary AP for UL OFDMA/UL MU-MIMO or UORA. The primary AP may send a NDP feedback trigger to the STAs and any STA that has feedback to send may indicate that it has a feedback to send. The primary AP may then trigger or poll the STA. STA1 and STA2 shown in FIG. 24 may transmit feedback based on the above-mentioned scheme. As shown in FIG. 24, AP1 may transmit feedback (FB) poll 2401 to STAs (STA1-STA4), then it turns out that only STA1 has a feedback (FB) 2404 to transmit. So, STA1 may transmit FB 2404. Similarly, STA2 and STA3 may transmit FB poll 2402 and FB poll 2403 respectively, and it turns out that only STA2 has a FB 2405 to transmit. It should be noted that the above-mentioned embodiment shown in FIG. 24 regarding the FB pool and FB transmissions is only given by way of example, and it's not intended to be exclusive or be limiting to the present application.

In some embodiments, the STA is unable to connect to a single STA. A set of APs may send a feedback poll or NDP feedback trigger to STA(s). Any STA that is unable to hear a single AP but is able to hear this poll or trigger may transmit a feedback to the APs. STA3 and STA4 shown in FIG. 24 may transmit feedback based on the above-mentioned scheme. As shown in FIGS. 24, AP1 and AP2 may be considered as a set of APs transmitting a feedback pool or NDP feedback trigger. Both of them may transmit the same FB pool (2406, 2406') to STAs, and it turns out that no STA has a feedback to transmit. AP1 and AP3 may be considered as a set of APs transmitting a feedback pool or NDP feedback trigger. Both of them may transmit the same FB pool (2407, 2407') to STAs, and it turns out that STA3 has a FB 2408 to transmit. AP2 and AP3 may be considered as a set of APs transmitting a feedback pool or NDP feedback trigger. Both of them may transmit the same FB pool (2409, 2409') to STAs, and it turns out that STA4 has a FB 2410 to transmit.

The APs may set their multi-AP transmission based on the feedback. In some embodiments, a multi-AP announcement frame may include the AP(s) and STA(s) selected for the specific multi-AP transmission. In some embodiments, the above-mentioned feedback and calculation result (e.g., fields, AP identifiers, bitmaps discussed above) may be exchanged between AP(s) and STA(s) using control frame, management frame, PLOP header of any frame or MAC header of any frame. After selecting AP(s) based on the feedback transmitted from the STA at process 1905, the selected AP(s) may perform multi-AP transmission (e.g., multi-AP data transmission) to the STA.

In another embodiment, at 1904, the STA may transmit the first parameter, the plurality of second parameters and the number of the plurality of APs to at least one AP in the group. Then, the above-mentioned calculation may be performed at AP side. That is, the feedback generated by the processor at 1904 may include the first parameter, the plurality of second parameters and the number of the plurality of APs. For example, the STA may obtain the first parameter indicating at most two APs in a desired AP combination; the total number of APs, i.e., 4; the second parameter is SINR value of each AP; the SINR value of AP1 is 6, the SINR value of AP2 is 12; the SINR value of AP3 is 18; and the SINR value of AP4 is 24. Then, the AP(s) received the feedback may perform the above-mentioned calculation and obtain, based on the calculation, a desired AP combination comprising one or more APs. In one method, the STA may feedback the quantized SINR values directly to the APs. In one method, the STA may calculate the average SINR value as SINR_average. Then calculate the difference between SINR_average and SINR values as SINR_diff_k=SINR_average-SINR_k. Here k is the AP index. The STA may feedback quantized SINR_diff_k values.

Then, the method 1900 may comprise: at 1906 receiving multi-AP transmission from a combination of one or more APs. Accordingly, the transceiver may be further configured to receive multi-AP transmission from a combination of one or more APs. Since the first parameter M indicated the max number of selected APs (i.e., there are at most M APs in a desired AP combination), the multi-AP transmission may be performed by multiple APs in the group, i.e., the number of APs selected for the multi-AP transmission (i.e., the number of APs in a selected combination of APs) should be less than or equal to M. Preferably, the multi-AP transmission may be performed by a combination of two or more APs.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method for multiple access point (AP) transmission, the method comprising:
   receiving a plurality of beacon repetitions, one from each of a plurality of APs, each of the plurality of beacon repetitions comprising a common information part and an AP-specific information part;
   decoding at least one of the common information parts to obtain a first parameter, wherein the first parameter indicates a maximum number of APs that may be selected to perform the multiple AP transmission;
   decoding the AP-specific information parts to obtain a plurality of second parameters, each associated with one of the plurality of APs;
   generating feedback based on the first parameter and the plurality of second parameters and a number of the plurality of APs; and
   transmitting the feedback to at least one of the plurality of APs.

2. The method of claim 1, wherein the generating feedback based on the first parameter and the plurality of second parameters and a number of the plurality of APs comprises:
   performing a calculation based on the first parameter, the plurality of second parameters and the number of the plurality of APs to obtain a calculation result; and
   generating the feedback based on the calculation result.

3. The method of claim 1 further comprising:
   receiving a multi-AP data transmission from a plurality of APs based on the feedback.

4. The method of claim 1, wherein the decoding at least one common information part to obtain a first parameter comprises:
   buffering the common information parts;
   combining the common information parts; and
   decoding the common information parts.

5. The method of claim 1, wherein the number of the plurality of APs is obtained by decoding the AP-specific information parts.

6. The method of claim 1, wherein, in each beacon repetition, the common information part and the AP-specific information part are aggregated together with no interframe spacing between them.

7. The method of claim 1, wherein, in each beacon repetition, the common information part and the AP-specific information part are transmitted with an interframe spacing between them.

8. The method of claim 1, wherein the second parameter is Signal to Noise Ratio (SNR) or Signal to Interference and Noise Ratio (SINR).

9. The method of claim 2, wherein the calculation result comprises a plurality of AP combinations.

10. The method of claim 1, wherein the feedback comprises a plurality of fields, each of the plurality fields comprising a third parameter and an identifier identifying a combination of two or more APs.

11. A station (STA) for multiple access point (AP) transmission, comprising:
    a transceiver, configured to receive a plurality of beacon repetition, one from each of a plurality of APs, each of the plurality of beacon repetition comprising a common information part and an AP-specific information part; and
    a processor, configured to
       decode at least one of the common information parts to obtain a first parameter, wherein the first parameter indicates a maximum number of APs that may be selected to perform the multiple AP transmission;
       decode the AP-specific information parts to obtain a plurality of second parameters, each associated with one of the plurality of APs; and
       generate feedback based on the first parameter, the plurality of second parameters and a number of the plurality of APs,
    wherein the transceiver is further configured to transmit the feedback to at least one of the plurality of APs.

12. The STA of claim 11, wherein to obtain the feedback, the processor is further configured to:

perform a calculation based on the first parameter, the plurality of second parameters and the number of the plurality of APs to obtain a calculation result; and generate the feedback based on the calculation result.

13. The STA of claim 11, the transceiver is further configured to receive a multi-AP data transmission from a plurality of APs based on the feedback.

14. The STA of claim 11, wherein to decode at least one common information part to obtain a first parameter, the processor is further configured to buffer the common information parts;

combine the common information parts; and decode the common information parts.

15. The STA of claim 11, wherein the number of the plurality of APs is obtained by decoding the received AP-specific information parts.

16. The STA of claim 11, wherein, in each beacon repetition, the common information part and the AP-specific information part are aggregated together with no interframe spacing between them.

17. The STA of claim 11, wherein, in each beacon repetition, the common information part and the AP-specific information part are transmitted with an interframe spacing between them.

18. The STA of claim 11, wherein the second parameter is Signal to Noise Ratio (SNR) or Signal to Interference and Noise Ratio (SINR).

19. The STA of claim 12, wherein the calculation result comprises a plurality of AP combinations.

20. The STA of claim 11, wherein the feedback comprises a plurality of fields, each of the plurality fields comprising a third parameter and an identifier identifying a combination of two or more APs.

* * * * *